US011958003B2

(12) United States Patent
Astle et al.

(10) Patent No.: US 11,958,003 B2
(45) Date of Patent: *Apr. 16, 2024

(54) PUSH FILTER WITH FLOATING KEY LOCK

(71) Applicant: KX Technologies LLC, West Haven, CT (US)

(72) Inventors: Robert Astle, Middlefield, CT (US); George Lauri, Windsor, CT (US); Stephen P. Huda, Shelton, CT (US); Michael J. Sherman, Woodbury, MN (US); Steven J. Haehn, Oakdale, MN (US); Erik R. Klimpel, Woodbury, MN (US); Will Anniss, Simpsonville, SC (US); Willard Grant, Williamston, SC (US); Raony Barrios, Anderson, SC (US); William Small, Belton, SC (US); Marcello Correa Machado, Anderson, SC (US); Thomas W. McCollough, Anderson, SC (US); Christopher Rousey, Anderson, SC (US); Ramesh Subramanian, Charlotte, NC (US)

(73) Assignee: KX TECHNOLOGIES LLC, West Haven, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/867,141

(22) Filed: Jul. 18, 2022

(65) Prior Publication Data

US 2022/0347606 A1    Nov. 3, 2022

Related U.S. Application Data

(60) Division of application No. 16/687,227, filed on Nov. 18, 2019, now Pat. No. 11,426,685, which is a
(Continued)

(51) Int. Cl.
*B01D 35/14* (2006.01)
*B01D 29/96* (2006.01)
*B01D 35/30* (2006.01)

(52) U.S. Cl.
CPC .............. *B01D 35/14* (2013.01); *B01D 29/96* (2013.01); *B01D 35/30* (2013.01); *B01D 35/306* (2013.01);
(Continued)

(58) Field of Classification Search
None
See application file for complete search history.

(56) References Cited

U.S. PATENT DOCUMENTS 3,679,317 A   7/1972  Larson
3,694,603 A   9/1972  Congelliere et al.
(Continued)

FOREIGN PATENT DOCUMENTS

DE   102006044744   3/2008
KR      200415015   4/2006
(Continued)

*Primary Examiner* — Benjamin M Kurtz
(74) *Attorney, Agent, or Firm* — DeLio Peterson & Curcio LLC; David R. Pegnataro

(57) ABSTRACT

A filter housing assembly for fluid filtration which may be attached to, and removed from, a filter base by a push-actuated release. The filter housing assembly has a top portion with an ingress port and egress port extending therefrom, and a protrusion extending from the filter housing longitudinally axial center. The ingress and egress port are formed in an hourglass shape. A filter key having a base with a groove for mating with said projection, at least one finger extending from said base, and an electronic circuit component housing attached thereto for receiving a printed circuit board, is connected to the filter housing top portion by mating said top portion protrusion with the filter key groove. Both of said ingress and egress port have at least one cavity
(Continued)

for the passage of fluid therethrough, where each cavity is exposed in a direction facing away from the printed circuit board.

14 Claims, 26 Drawing Sheets

Related U.S. Application Data continuation-in-part of application No. 16/235,134, filed on Dec. 28, 2018, now Pat. No. 10,857,492, which is a continuation of application No. 14/947,271, filed on Nov. 20, 2015, now Pat. No. 10,207,211, which is a continuation of application No. 14/053,086, filed on Oct. 14, 2013, now Pat. No. 9,233,322, which is a continuation-in-part of application No. 13/645,726, filed on Oct. 5, 2012, now Pat. No. 8,673,146, which is a continuation of application No. 13/396,316, filed on Feb. 14, 2012, now Pat. No. 8,366,930, which is a continuation of application No. 12/188,816, filed on Aug. 8, 2008, now Pat. No. 8,137,551.

(52) U.S. Cl.
CPC .. *B01D 2201/301* (2013.01); *B01D 2201/302* (2013.01); *B01D 2201/305* (2013.01); *B01D 2201/4053* (2013.01); *B01D 2201/4061* (2013.01); *B01D 2201/4076* (2013.01)

(56) References Cited

U.S. PATENT DOCUMENTS

| | | | |
|---|---|---|---|
| 4,308,440 A | 12/1981 | Buttner | |
| 4,392,029 A | 7/1983 | Schaad et al. | |
| 5,035,797 A | 7/1991 | Janik | |
| 5,135,645 A | 8/1992 | Sklenak et al. | |
| 5,147,722 A | 9/1992 | Koslow | |
| 5,700,371 A | 12/1997 | Koslow | |
| 5,914,037 A | 6/1999 | Yen | |
| D438,214 S | 2/2001 | Gieseke et al. | |
| 6,306,290 B1 | 10/2001 | Rolfes | |
| 6,331,037 B1 | 12/2001 | Roscher et al. | |
| 6,595,371 B1 | 7/2003 | Desmarais | |
| 6,630,016 B2 | 10/2003 | Koslow | |
| 6,632,355 B2 | 10/2003 | Fritze | |
| D494,654 S | 8/2004 | Macaulay et al. | |
| 6,797,167 B2 | 9/2004 | Koslow | |
| 6,835,311 B2 | 12/2004 | Koslow | |
| 6,872,311 B2 | 3/2005 | Koslow | |
| 8,137,551 B1 | 3/2012 | Huda et al. | |
| 8,366,930 B2 | 2/2013 | Huda et al. | |
| 8,673,146 B2 | 3/2014 | Huda et al. | |
| D731,616 S | 6/2015 | Zou | |
| 9,233,322 B1 | 1/2016 | Huda et al. | |
| D759,790 S | 6/2016 | Baird | |
| D760,868 S | 7/2016 | Lu | |
| D774,623 S | 12/2016 | Lu | |
| D784,492 S | 4/2017 | Lu | |
| D788,879 S | 6/2017 | Zou | |
| D803,980 S | 11/2017 | Zou | |
| D818,083 S | 5/2018 | Dishman | |
| D820,386 S | 6/2018 | Campbell | |
| D820,387 S | 6/2018 | Campbell | |
| 10,040,703 B2 | 8/2018 | Huda et al. | |
| D827,767 S | 9/2018 | Lu | |
| D831,154 S | 10/2018 | Campbell | |
| D831,155 S | 10/2018 | Campbell | |
| D831,156 S | 10/2018 | Campbell | |
| 10,087,085 B2 | 10/2018 | Baird et al. | |
| 2002/0185425 A1 | 12/2002 | Bassett et al. | |
| 2003/0024860 A1 | 2/2003 | Fritze | |
| 2003/0168389 A1 | 9/2003 | Astle et al. | |
| 2004/0104161 A1 | 6/2004 | Gaignet et al. | |
| 2004/0119297 A1 | 6/2004 | Bella et al. | |
| 2005/0051487 A1 | 3/2005 | Koslow | |
| 2005/0111827 A1 | 5/2005 | Sullivan | |
| 2005/0252841 A1 | 11/2005 | Bassett et al. | |
| 2006/0000761 A1 | 1/2006 | Choi et al. | |
| 2006/0060512 A1* | 3/2006 | Astle | C02F 9/20 210/90 |
| 2006/0151371 A1 | 7/2006 | Weinberger et al. | |
| 2006/0278575 A1* | 12/2006 | Jokschas | B01D 27/08 210/493.1 |
| 2007/0199876 A1 | 8/2007 | Tubby et al. | |
| 2008/0047889 A1 | 2/2008 | Huda | |
| 2009/0093752 A1 | 4/2009 | Richard et al. | |
| 2013/0068672 A1 | 3/2013 | Kruckenberg et al. | |
| 2015/0258476 A1 | 9/2015 | Boyce et al. | |
| 2015/0306526 A1 | 10/2015 | Huda et al. | |
| 2015/0307365 A1* | 10/2015 | Baird | G01M 3/26 73/40.7 |
| 2016/0074783 A1 | 3/2016 | Huda et al. | |
| 2016/0075566 A1* | 3/2016 | Froelicher | B01D 35/30 210/236 |
| 2016/0082392 A1 | 3/2016 | Huda et al. | |
| 2016/0175743 A1 | 6/2016 | Baird | |
| 2018/0214804 A1* | 8/2018 | Dishman | F25D 23/126 |
| 2019/0134543 A1 | 5/2019 | Huda et al. | |
| 2020/0108338 A1 | 4/2020 | Astle et al. | |

FOREIGN PATENT DOCUMENTS

| | | |
|---|---|---|
| KR | 200428894 | 10/2006 |
| KR | 100804302 | 2/2008 |

* cited by examiner

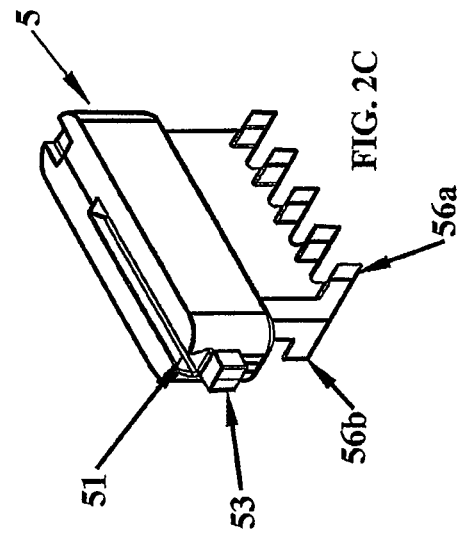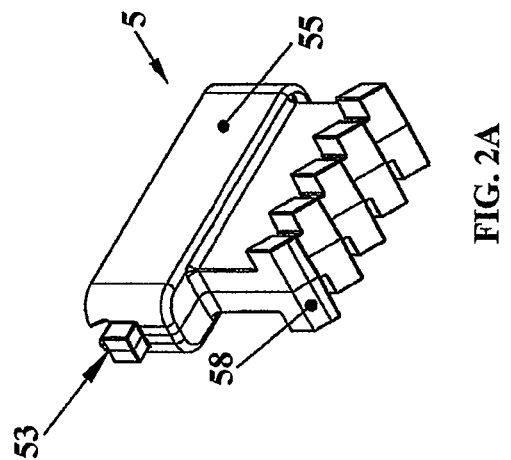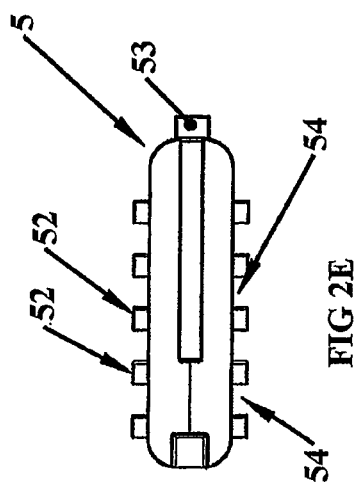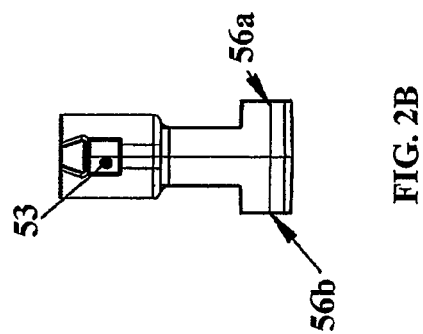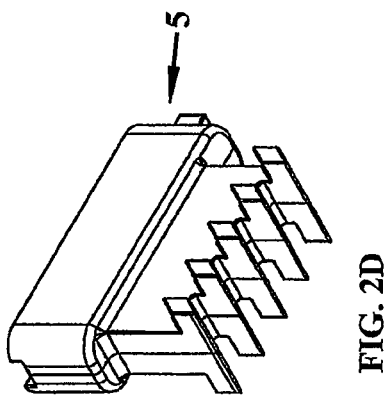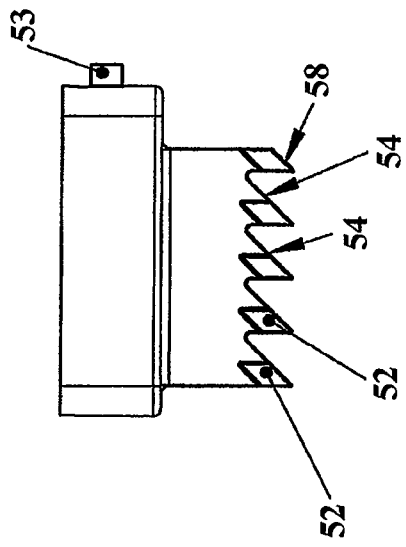

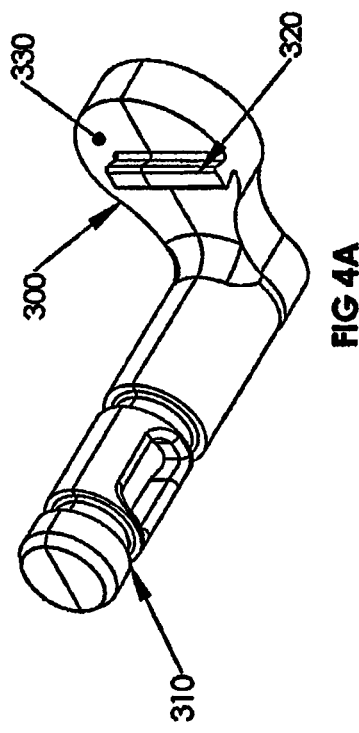
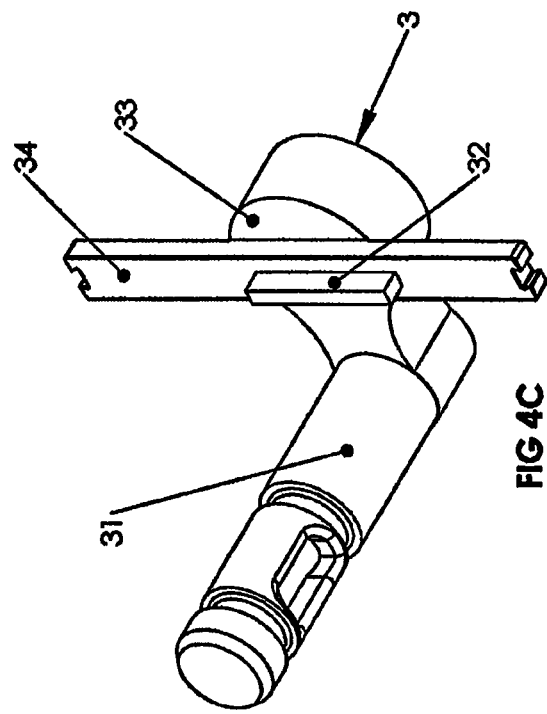

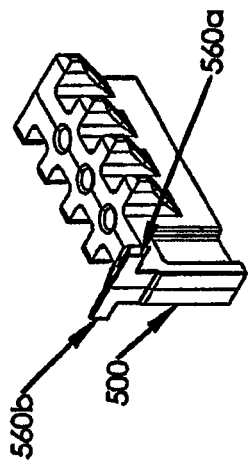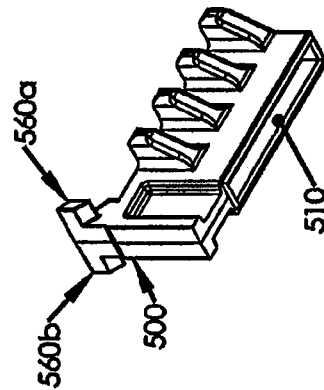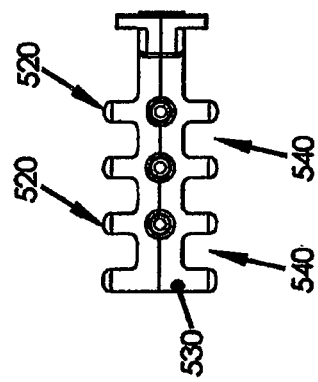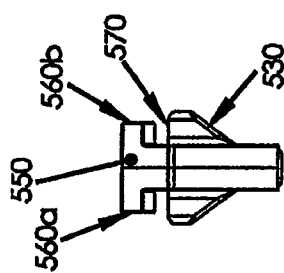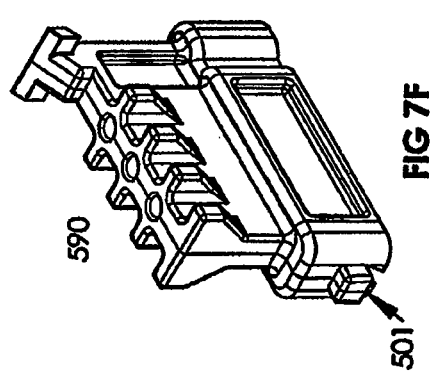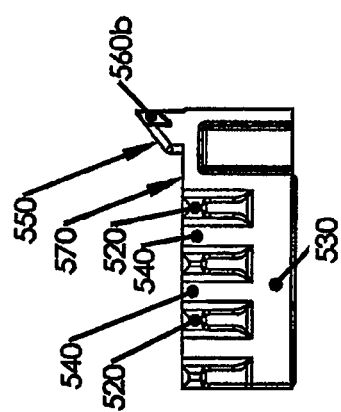

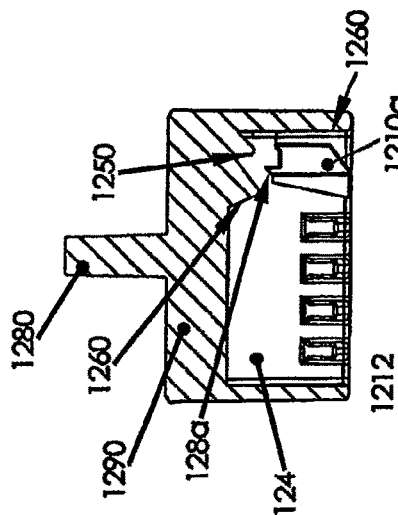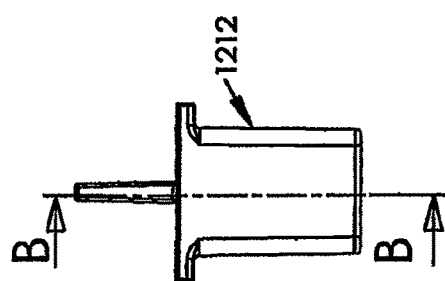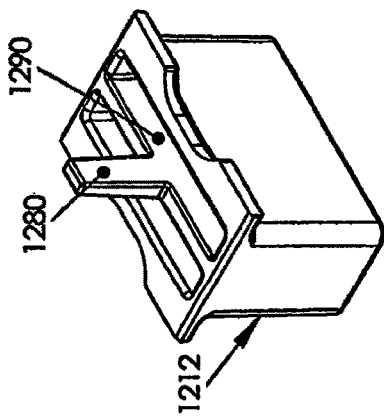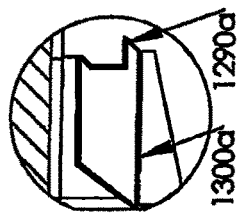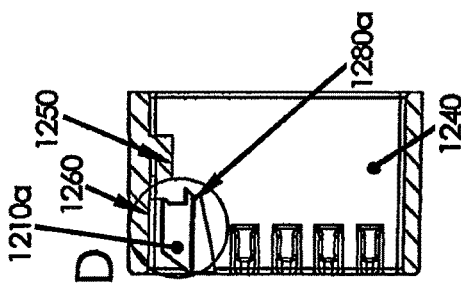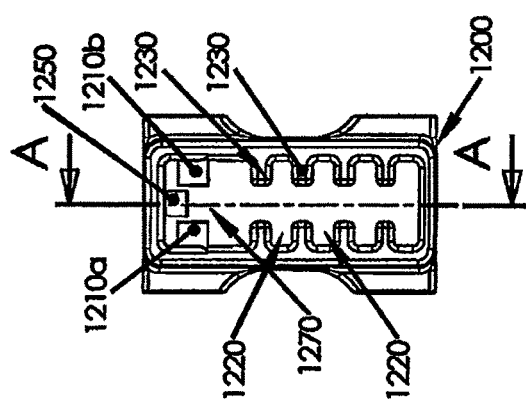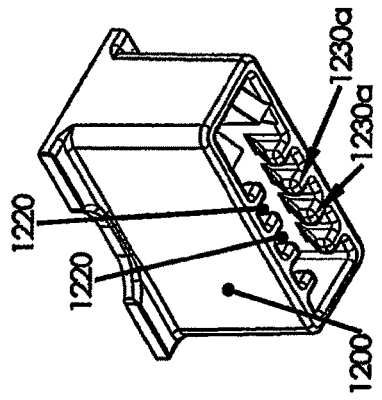

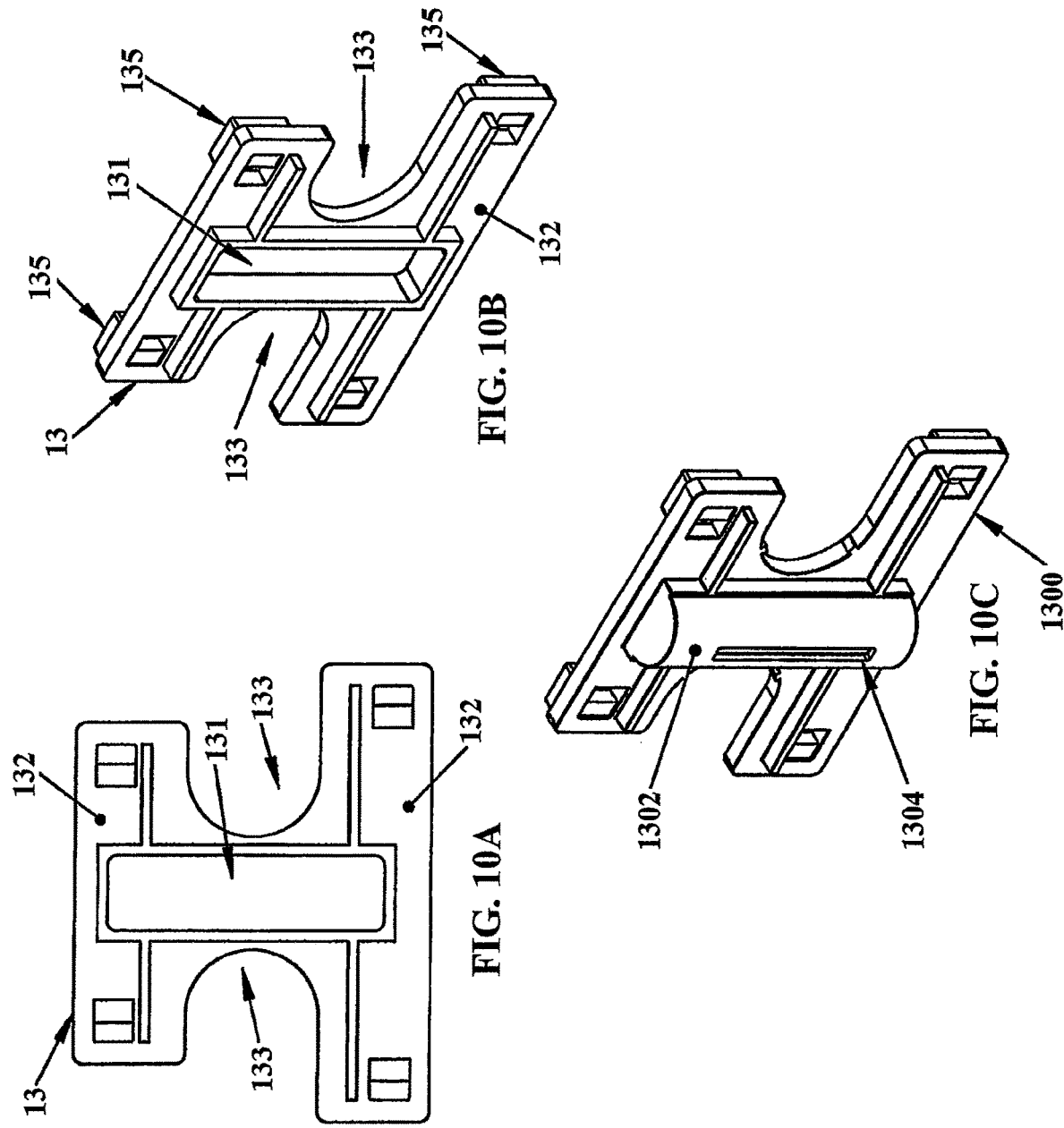

PUSH FILTER WITH FLOATING KEY LOCK

BACKGROUND OF THE INVENTION

1. Field of the Invention

This invention relates to a filtering apparatus, specifically a filter housing apparatus to facilitate easy removal and replacement of a filter housing from a mechanical support, and more specifically, to a push filter design that activates a floating key lock, where the key may be used simultaneously as a lock and as an identifier for particular filter attributes. The mechanical support may be situated inline, and in fluid communication, with influent and effluent piping, such as within a refrigerator. More specifically, the invention relates to a filter housing and mount, whereby the filter housing may be attached to, and removed from, the mount by a push-actuated release. A controlled attachment or detachment of the filter sump, containing the filter media, is activated by the axial push of the sump towards the mechanical support. The specific key lock design allows a user to identify and match certain filter configurations received by the mechanical support, and reject other filter configurations. An internal shutoff, activated by the push-actuated release, blocks spillage during filter housing removal and replacement.

2. Description of Related Art

The invention relates to a water filtration system having a locking and unlocking mechanism for changing the filter when the filter media has served its useful life. The use of liquid filtration devices is well known in the art as shown in U.S. Pat. Nos. 5,135,645, 5,914,037 and 6,632,355. Although these patents show filters for water filtration, the filters are difficult to replace owing to their design and placement. For example, U.S. Pat. No. 5,135,645 discloses a filter cartridge as a plug-in cartridge with a series of switches to prevent the flow of water when the filter cartridge is removed for replacement. The filter must be manually inserted and removed and have a switch activated to activate valve mechanisms so as to prevent the flow of water when the filter is removed. The cover of the filter is placed in the sidewall of a refrigerator and is employed to activate the switches that activate the valves. The filter access is coplanar with the refrigerator wall and forces an awkward access to the filter cartridge.

In U.S. patent application Ser. No. 11/511,599 filed on Aug. 28, 2006, for Huda, entitled: "FILTER HOUSING APPARATUS WITH ROTATING FILTER REPLACEMENT MECHANISM," a filter assembly having a rotator actuating mechanism including a first internal rotator and a second internal rotator is taught as an efficient way to insert, lock, and remove the filter housing from its base. A simple push mechanism actuates the self-driving release and change over means that hold and release the filter housing sump, and provide influent shutoff to prevent leaking and spillage. Rotational shutoff and locking mechanisms are activated and released by axial force on the filter housing at the commencement of the filter changing procedure.

The instant invention is particularly useful as the water filtering system for a refrigerator having water dispensing means and, optionally, an ice dispensing means. The water used in the refrigerator or water and ice may contain contaminants from municipal water sources or from underground wells or aquifers. Accordingly, it is advantageous to provide a water filtration system to reduce rust, sand, silt, dirt, sediment, heavy metals, microbiological contaminants, such as Giardia cysts, chlorine, pesticides, mercury, benzene, toluene, MTBE, Cadmium bacteria, viruses, and other known contaminants. Particularly useful water filter media for microbiological contaminants include those found in U.S. Pat. Nos. 6,872,311, 6,835,311, 6,797,167, 6,630,016, 5,331,037, and 5,147,722, and are incorporated herein by reference thereto. One of the uses of the instant filter apparatus is as a water filtration apparatus for a refrigerator. Refrigerators are appliances with an outer cabinet, a refrigeration compartment disposed within the outer cabinet and having a rear wall, a pair of opposing side walls, at least one door disposed opposite the rear wall, a top and a bottom and a freezer compartment disposed in the outer cabinet and adjacent to the refrigeration compartment. It is common for refrigerators to have a water dispenser disposed in the door and in fluid communication with a source of water and a filter for filtering the water. Further, it is common for refrigerators to have an ice dispenser in the door and be in fluid communication with a source of water and a filter for filtering the water. It has been found that the filter assembly of the instant invention is useful as a filter for a refrigerator having a water dispenser and/or an ice dispenser.

SUMMARY OF THE INVENTION

The present invention is directed to, in a first aspect, a filter cartridge assembly comprising: a housing having a substantially cylindrical body, and a top portion for forming a fluid-tight seal with the body, the housing top portion including: an ingress port and an egress port, each extending vertically upwards from said filter cartridge housing top portion in a direction parallel to an axial center line of said filter cartridge assembly, wherein each of said ingress port and egress port have at least one portion or segment approximately cylindrical in cross-section, including a first segment forming a top portion of said ingress port and egress port, a third segment adjacent said housing top portion, and a second segment located between said first and third segments having at least one aperture or cavity for fluid flow, the first segment and third segment having approximately a same first diameter, and the second segment having a second diameter unequal to the first diameter; and a filter key located on the housing top portion for mating attachment to a filter base, the filter key having a filter key base with an exposed front face, exposed rear face, and exposed side faces, and comprising an extended finger including on one side a contacting portion forming a first face exposed in a first direction with respect to the housing top portion and an adjacent side forming a second face exposed in a second direction with respect to the housing top portion, such that the first and the second directions are not the same.

The filter cartridge assembly ingress and egress port second segments may be formed in an hourglass shape.

The filter cartridge assembly ingress and egress ports may be positioned along a chord line that does not intersect the axial center of the housing top portion, such that a diameter line traversing perpendicularly through said chord line is dissected in unequal parts.

The filter cartridge assembly ingress and egress port second segment cavities may be exposed in a direction facing the filter key rear face.

The filter cartridge assembly may further comprise a printed circuit board housing located or connected to the housing top portion, or connected to or integral with the filter key base, and the printed circuit board housing may further be disposed adjacent to the filter key. The printed circuit board housing may include a recess cavity for receiving a printed circuit board therein, and for further securing said printed circuit board to the housing top portion. Terminals may further be disposed on the printed circuit board for electrical connection to said filter cartridge housing on one side, and electrical connection with electronics imbedded on an opposite side.

In a second aspect, the present invention is directed to a filter cartridge assembly comprising: a housing having a substantially cylindrical body with an axial center line, and a top portion for forming a fluid-tight seal with the body, the housing top portion including: an ingress port and egress port extending from the housing top portion, each of said ingress port and egress port having a body with a top segment, a middle segment, and a bottom segment adjacent to the housing top segment and in fluid communication with said cylindrical body, the ingress port and egress port top segments having at least one seal at the junction with said middle segments, and the ingress port and egress port bottom segments having at least one seal at the junction with said middle segments, each of said seals having an outer surface first diameter, and the ingress port and egress port middle segments having an outer surface with a diametric extension less than the ingress port and egress port respective seal first diameters; and a filter key located on or connected to the housing for mating attachment to a filter base, the filter key comprising an extended finger including on one side a contacting portion forming a first angle in a first direction with respect to the housing top portion axial center line and an adjacent side forming a second angle in the first direction with respect to the housing top portion axial center line, such that the first angle and the second angle are not equal, said contacting portion shaped for slidably interacting with a filter base attachment member.

The ingress port and egress port middle segments may be formed in an hourglass shape.

The ingress port may further include a cavity on its body for the passage of fluid and the egress port may further include a cavity on its body for the passage of fluid, and the ingress port cavity and egress port cavity may both be exposed in a direction opposite the filter key finger contacting portion.

The ingress port and egress port may extend from a non-diameter chord line of the housing top portion.

The ingress port top segment and bottom segment and egress port top segment and bottom segment may be substantially cylindrical.

The filter cartridge assembly may further comprise a printed circuit board housing for connecting a printed circuit board to the housing top portion, and the printed circuit board may be further disposed adjacent to the filter key. The printed circuit board housing may have a recess and be disposed adjacent to and at least partially surrounding the filter key, and the filter key may extend partially into the printed circuit board recess. The printed circuit board housing may be formed in a substantially horseshoe shape.

In a third aspect, the present invention is directed to a filter cartridge assembly comprising: a housing having a substantially cylindrical body and a top portion for forming a fluid-tight seal with the body, the housing top portion having an axial center and further including: an ingress port and egress port extending from the housing top portion, each of said ingress port and egress port having a body with a top segment, a middle segment, and a bottom segment adjacent to the housing top segment and in fluid communication with said cylindrical body, the ingress port and egress port top segments having at least one seal at the junction with said middle segments, and the ingress port and egress port bottom segments having at least one seal at the junction with said middle segments, each of said seals having an outer surface first diameter, and the ingress port and egress port middle segments having an outer surface with a diametric extension less than the ingress port and egress port respective seal first diameters, such that the ingress port middle segment and egress port middle segment are formed in an hourglass shape; a filter key located on or connected to the housing for mating attachment to a filter base, the filter key comprising an extended finger including on one side a contacting portion forming a first angle in a first direction with respect to the housing top portion and an adjacent side forming a second angle in the first direction with respect to the housing top portion, such that the first angle and the second angle are not equal; an electronic circuit component housing disposed adjacent to the filter key and having a recess for receiving an electronic circuit component therein, and for further connecting said electronic circuit component to the housing top portion, said electronic circuit component housing located on or connected to the filter cartridge assembly housing; and a cavity on the ingress port second width for the passage of fluid, and a cavity on the egress port second width for the passage of fluid, the ingress port cavity and egress port cavity exposed in a direction facing away from the printed circuit board.

The filter cartridge assembly ingress and egress ports may extend from a non-diameter chord line of the housing top portion.

The filter cartridge assembly electronic circuit component may be a printed circuit board.

The filter cartridge assembly electronic circuit component housing may at least partially surround the filter key, and the filter key may extend partially into the electronic circuit component housing recess. The electronic circuit component housing recess may further include terminals disposed therein for connecting said printed circuit board to said filter cartridge assembly housing.

It is an object of this invention to provide a filter housing apparatus mounted to a base and having an automatic locking mechanism for simple replacement and removal.

It is an object of this invention to provide a filter housing apparatus and base attached by a push activated, slideably moveable, floating lock.

It is another object of this invention to provide a filter housing apparatus mounted on a surface having non-rotating locking means with pressure activation for replacement and removal.

It is another object of the present invention to provide a filter housing apparatus that allows for a keyed identification of the filter.

It is a further object of this invention to provide a filter housing apparatus for use with water dispensing and\or ice dispensing apparatus whereby filtered water is provided to the water dispensing and/or ice dispensing apparatus.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the description of the embodiment(s), which follows, taken in conjunction with the accompanying drawings in which:

FIG. 2A is a perspective view of one embodiment of the filter key of the present invention.

FIG. 2B is a lateral side view of the filter key of FIG. 2A.

FIG. 2C depicts a bottom plan view of the filter key of FIG. 2A showing a groove and a locking nub or tab for attachments.

FIG. 2D depicts a perspective view from the opposite side of the filter key of FIG. 2C.

FIG. 2E depicts a bottom view of the filter key of FIG. 2A.

FIG. 2F is a longitudinal side view of the filter key of FIG. 2A.

FIG. 4A is a perspective view of one embodiment of the filter manifold.

FIG. 4B is a top plan view of a second embodiment of the filter manifold with an extension support member.

FIG. 4C is a perspective view of a second embodiment of the filter manifold.

FIG. 7A is a top perspective view of an embodiment of the filter key of the present invention having an extended boss.

FIG. 7B is a bottom perspective view of the filter key of FIG. 7A.

FIG. 7C depicts a top plan view of the filter key of FIG. 7A.

FIG. 7D depicts a side plan view of the filter key of FIG. 7A.

FIG. 7E depicts an end or lateral side view of the embodiment of the filter key of FIG. 7A, showing the boss rising above the plane created by the fingers, and two wings extending laterally outwards from the boss.

FIG. 7F is a perspective view of another embodiment of the filter key of the present invention showing a locking nub located on the bottom portion on a lateral side.

FIG. 8A depicts a perspective view of an embodiment of the floating lock of the present invention.

FIG. 8B is a top view of the floating lock of FIG. 8A.

FIG. 8C is a cross-sectional view of the floating lock of FIG. 8A depicting a drive key located at one end of the floating lock on the longitudinal or side panel.

FIG. 8D depicts an exploded view of the drive key of FIG. 8C showing the edge angle and face.

FIG. 8E depicts a perspective view of a floating lock having an extension member.

FIG. 8F is a side view of the floating lock of FIG. 8E having an extension member.

FIG. 8G is a lateral or cross-sectional view of the floating lock of FIG. 8E with an extension member.

FIG. 10A is a top plan view of one embodiment of the rear plate of the present invention.

FIG. 10B is a bottom perspective view of the rear plate of FIG. 10A.

FIG. 10C is a top plan view of a second embodiment of the rear plate of the present invention.

DETAILED DESCRIPTION OF THE EMBODIMENT(S)

In describing the embodiment(s) of the present invention, reference will be made herein to FIGS. 1 to 14 of the drawings in which like numerals refer to like features of the invention. Features of the invention are not necessarily shown to scale.

The present invention is directed to a filter housing assembly for filtration of liquids, including the interception of chemical, particulate, and/or microbiological contaminants. The use of the mechanical locking assembly of the filter housing without the need for excess force and tight tolerances essential in prior art filter housings makes for easy and frequent filter changes and optimal filter performance. The filter housing assembly of the present invention provides simplified filter changes to minimize process downtime and without recourse to tools. A simple push mechanism actuates the self-driving release and change over means that hold and release the filter housing sump or filter cartridge, and provides influent shutoff means to prevent leaking and spillage. A floating lock or sliding lock responsive to an axial insertion force from the filter cartridge moves perpendicular or radially to the axial motion of the sump, and allows a specific connector piece or filter key to insert within the floating lock. Once inserted, the floating lock retracts towards its original position under a resilient force, such as two springs in tandem, or other complementary resilient mechanism keeping the floating lock under retraction tension when moved from its initial position. The filter key and floating lock combination allows for the identification of specific filter models and may be configured to reject all but specific filter types.

Removal of the filter cartridge is performed in the same manner. An axial insertion force causes the floating lock to move orthogonally, which allows the filter key to be removed from the floating lock. An extraction force provided by spring tension, or the like, helps push the filter cartridge out of its base. Fluid shutoff and locking mechanisms are initiated by the axial force on the filter cartridge at the commencement of the filter changing procedure.

The present invention is described below in reference to its application in connection with, and operation of, a water treatment system. However, it should be apparent to those having ordinary skill in the art that the invention may be applicable to any device having a need for filtering liquid.

Figure 1A:
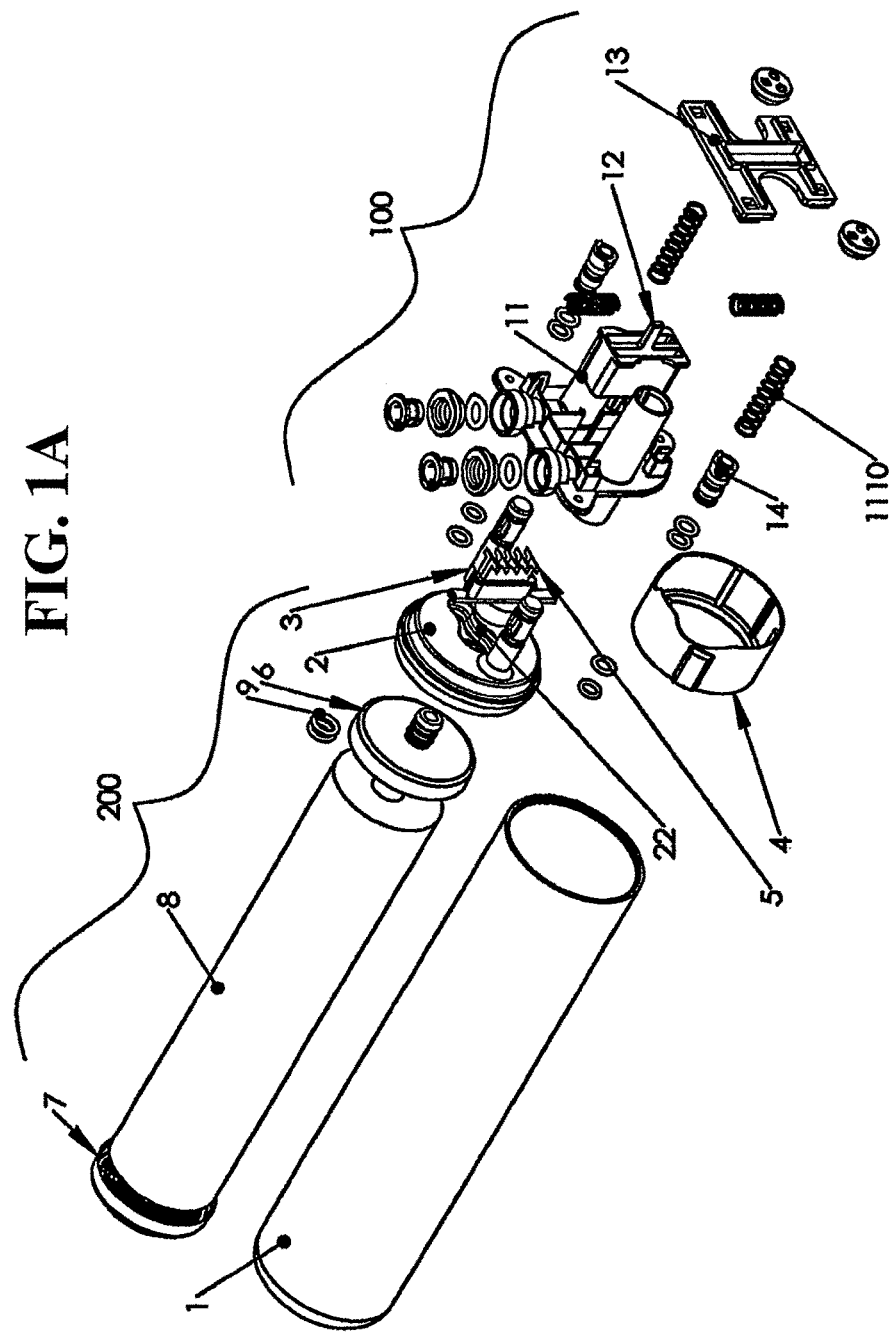
FIG. 1A is a top exploded view of one embodiment of the filter assembly of the present invention.

FIG. 1A is a top exploded view of an embodiment of the filter assembly of the present invention. The filter assembly is fixably secured in a position within an operating environment requiring fluid filtration, such as attached to an internal sidewall of a refrigerator, although certainly other operating environments may be envisioned, and the filter assembly may be used in any number of environments where the filter assembly has access to, and can be placed in fluid communication with, influent and effluent fluid access ports. For illustrative purposes only, application to the filtering of water being piped into a refrigerator is discussed.

A filter housing assembly 200 comprises the removable, detachable filter cartridge or sump of the filter assembly from a filter base 100. Filter housing assembly 200 includes a filter housing 1, which encloses filter media 8, a filter head 2 that attaches at one end to filter housing 1, and attaches at the other end to a filter manifold 3 and non-floating port 11. A connector piece or filter key 5 is attached to filter manifold 3. Filter base 100 includes non-floating port 11 having a base platform 1104, floating lock 12, and rear plate 13. Filter head 2 secures in a water-tight fit to filter housing 1. The attachment scheme may be made by a water-tight screw fit, bond, weld, or other water-tight fastening mechanism commonly used in the art for sealing adjoining components, typically adjoining plastic components. As discussed in further detail below, filter key 5 is connected to filter manifold 3. Filter key 5 may be formed as one piece with filter manifold 3, or may be securely attached by other methods, such as bonding, welding, press fit, friction fit, or the like. Filter key 5 may also be removably attached for replacement by an end user. Filter manifold 3 is attached to filter head 2. Filter media 8 is located in filter housing 1. Each end of filter media 8 is secured by a cap that facilitates the direction of the fluid being treated by the filter. At one end, filter media 8 is secured by a closed end cap 7, and at the other end by open end cap 6. Filter media 8 may be any filter media known in the art, and preferably, is a carbon block filter. It is typically shaped in a similar fashion as filter housing 1, which in an embodiment is cylindrical. Open end cap 6 is designed to interface and be in fluid communication with filter head 2.

Figure 1B:
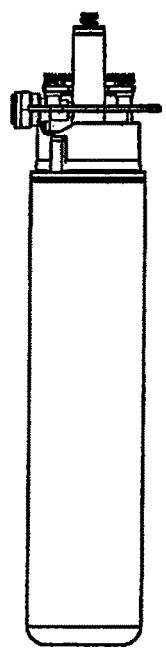
FIG. 1B is a side plan view the embodiment of the filter housing assembly of FIG. 1A.
Figure 1C:
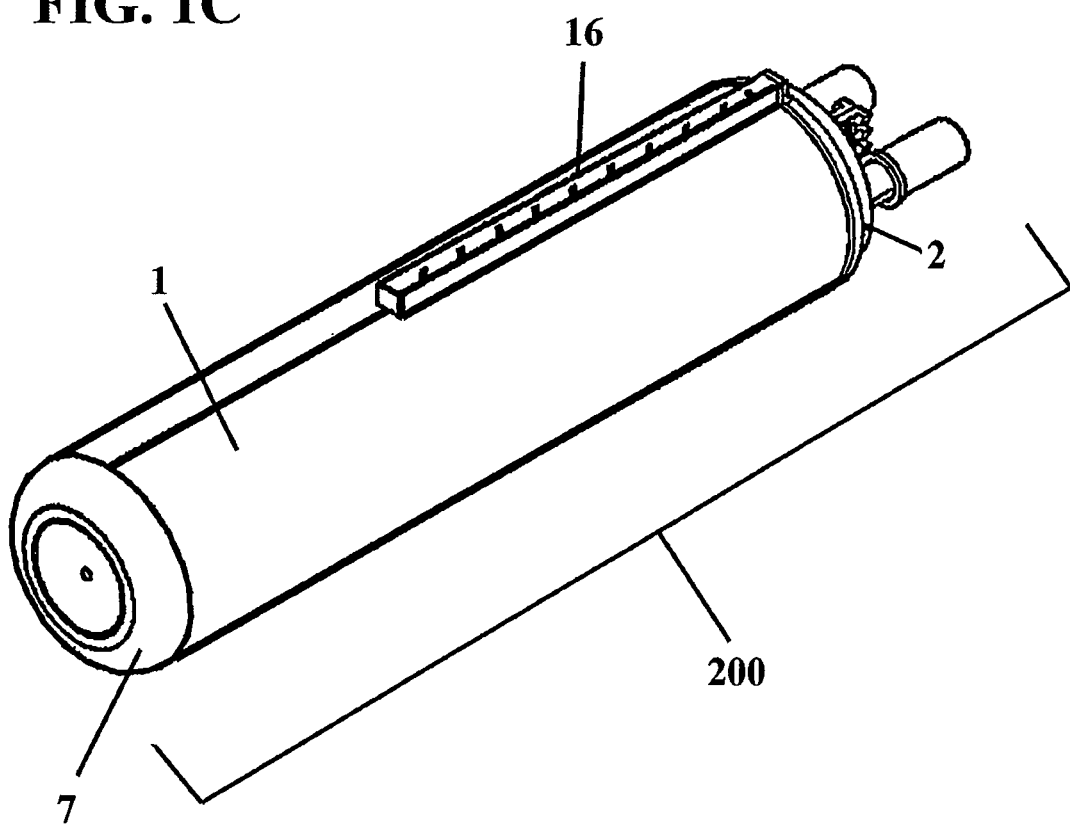
FIG. 1C depicts a perspective view of the filter housing assembly with strengthening ribs extending at least partially down the outer surface of the filter housing.

In another embodiment, filter housing 1 may include strengthening ribs 16 longitudinally located on the filter housing outer surface. FIG. 1C depicts a perspective view of filter housing assembly 200 with a row of strengthening ribs 16 extending at least partially down the outer surface of filter housing 1. Strengthening ribs 16 also function as a guide for inserting filter housing assembly 200 into a shroud (not shown) that may be part of the installation assembly for ensuring proper alignment with filter base 100. Strengthening ribs 16 is preferably integral with filter housing 1, but may also be attachable as a separate component part. Ribs 16 may extend the full length of filter housing 1, or as shown, may extend to an intermediate point between filter housing assembly 200 end caps 6, 7.

Filter housing assembly 200 is a finished assembly including filter housing 1, which encompasses filter media 8 by closed end cap 7 at one end, and open end cap 6 at the other. Generally, o-ring seals, such as o-ring seal 9, are used to prevent water leakage where different components are expected to mate. Filter manifold 3 and filter key 5 are joined with filter head 2, and secured to filter housing 1 to form the assembled filter housing apparatus 200. These components may be integral, permanently secured, or removably attached to one another, and to filter head 2. FIG. 1B is a side plan view of an embodiment of the filter assembly of the present invention.

FIG. 2A is a perspective view of connector piece or filter key 5.

FIG. 2B is a lateral side view of filter key 5. As previously noted, the bottom of filter key 5 is attached to filter manifold 3 by any number of fastening schemes, or may be integrally formed with filter manifold 3.

FIG. 2C depicts a groove 51 that is preferably shaped to receive a complementary protrusion on filter manifold 3, and is preferably shaped to receive a dovetail protrusion; however, other connecting, complementary shapes are not excluded.

Figure 2G:
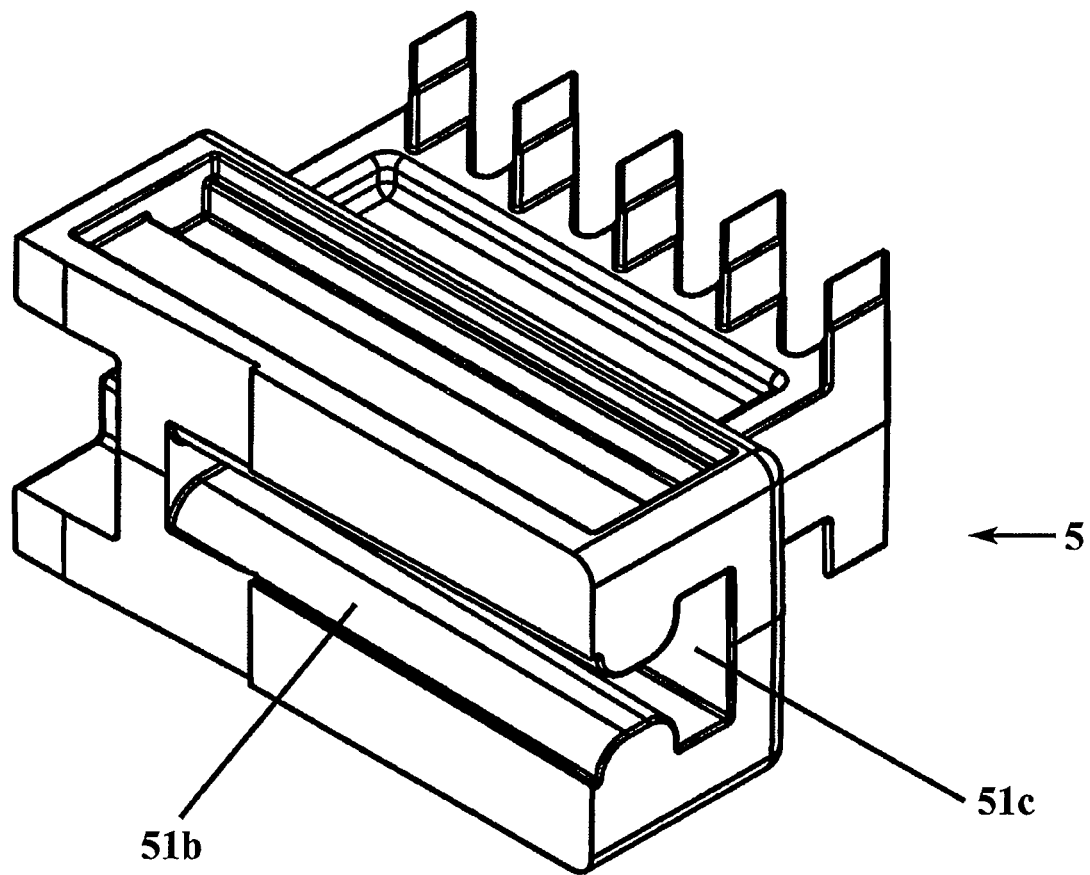
FIG. 2G depicts a slotted groove which includes a wider upper portion for securely affixing the filter key to the filter head or filter manifold.

For example, FIG. 2G depicts a slotted groove 51b that is not a dovetail joint. Slotted groove 51b may include a wider upper portion 51c to more securely affix filter key 5 to filter manifold 3. The connection of filter key 5 with filter manifold 3 may be bonded, sonic welded, press fitted, friction fitted, or the like. Moreover, filter key 5 may be integral with filter manifold 3. Similarly, filter manifold 3 may be bonded, sonic welded, press fitted, friction fitted, or integral with the filter housing top portion. As depicted in the illustrative embodiment, groove 51 is shaped to accept a snap feature for a press or snap fit located on filter manifold 3. In this manner filter key 5 may be removably attached to filter manifold 3. Similarly, filter manifold 3 may be designed to be removably attached to filter head 2. Thus, the design has more flexibility to introduce and accommodate different key configurations, which can be used to designate specific filter types, and purposely reject other filter types. Additionally, filter key 5 may include an angled, ramp segment 59a on at least its bottom edges where filter key 5 slidably mates with the top surface of filter manifold 3 or filter head 400.

Figure 2H:
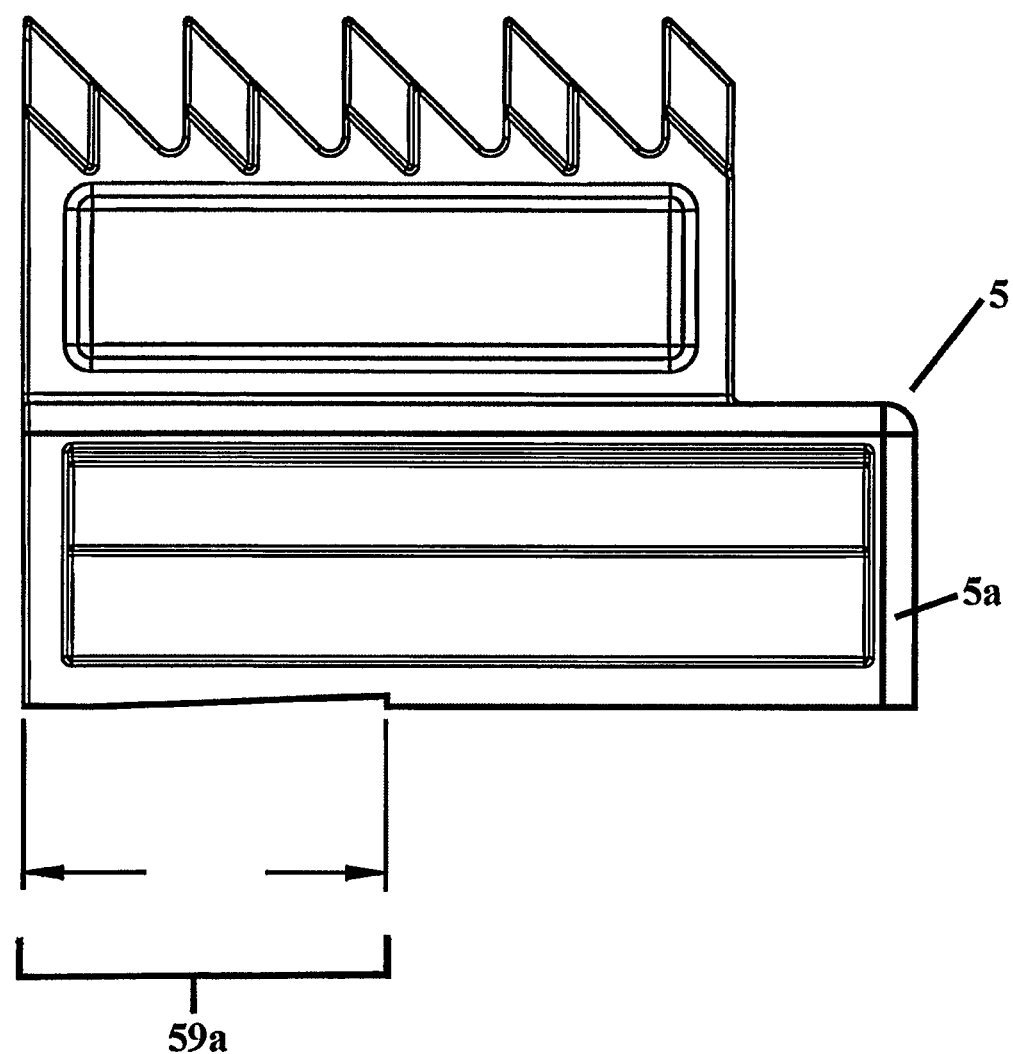
FIG. 2H is a side view of the filter key depicting an angled, ramp segment, which at least partially extends the length of the bottom surface of the filter key.

FIG. 2H is a side view of filter key 5 depicting angled ramp segment 59a, which at least partially extends the length of the bottom surface of filter key 5. Angled ramp 59a is located at one end of the bottom edges of filter key 5 and extends into the filter key main body 5a.

Figure 2I:
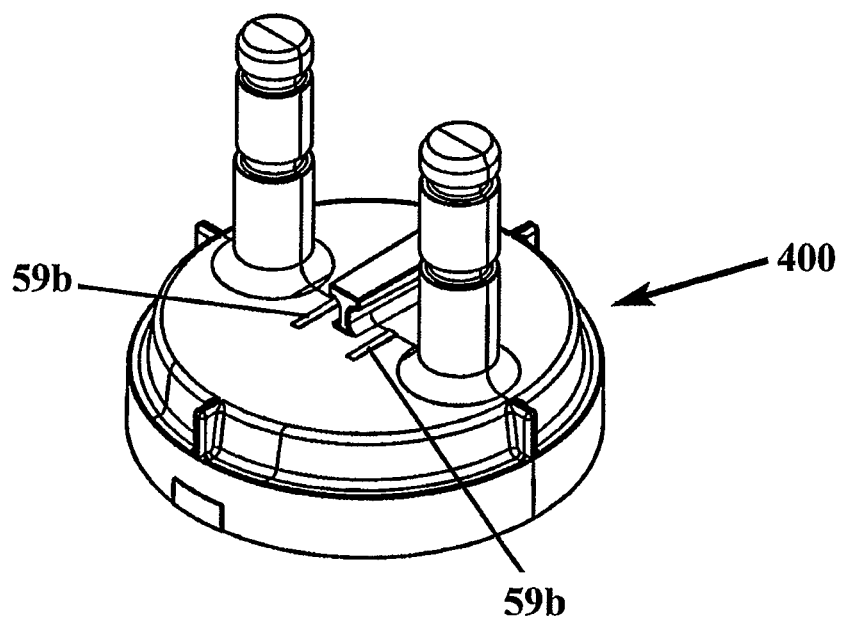
FIG. 2I depicts the complementary angled ramp segment for the filter key of FIG. 2H.

FIG. 2I depicts a perspective view of filter head 400 with complementary angled ramp segments 59b for mating with angled ramp segments 59a of filter key 5. Angled ramp segment 59a matably adjoins complementary angled ramp segment 59b to interlock and assist in securing filter key 5 to filter head 400. For the two-piece design utilizing filter manifold 3, complementary angled ramp segments 59b are formed on the top surface of filter manifold 3.

Figure 2J:
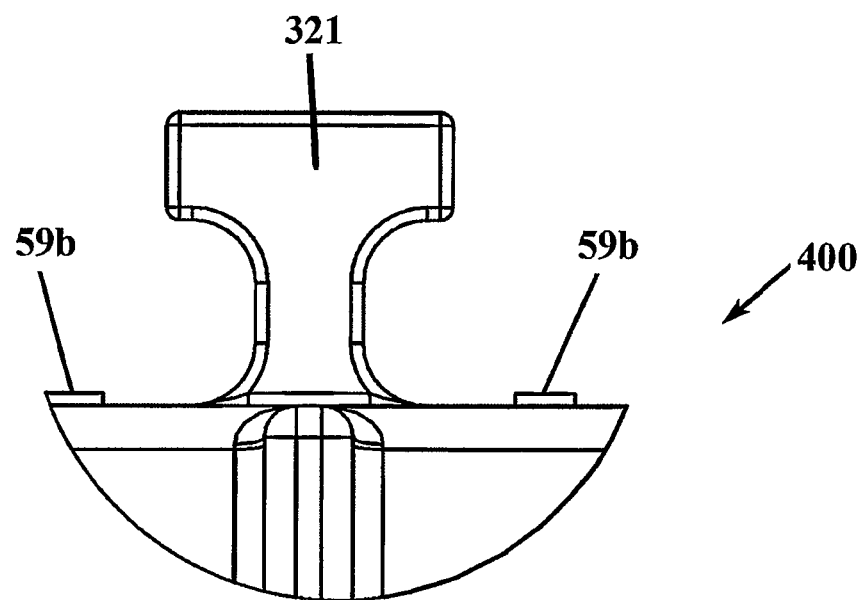
FIG. 2J depicts a side view of a partial section of the filter head showing a mating protrusion for interlocking with the slotted groove on the filter key, and complementary angled ramp segments for interlocking with the ramp segments on the filter key bottom edges.

FIG. 2J depicts a side view of a partial section of filter head 400 showing mating protrusion or rail 321 for interlocking with slotted groove 51b, and complementary angled ramp segments 59b.

FIG. 4A depicts a perspective view of the one embodiment of filter manifold 300. Port 310 is shown off center of filter manifold 300. FIG. 4A depicts the filter manifold without extension support members. Preferably, port 310 is an outlet port; however, the present invention is not limited to a specific ingress and egress location, and may have these ports interchanged. When port 310 is used as an egress or outlet port, filter manifold 300 takes fluid from filter media 8 through the center port of open cap 6, and directs fluid flow radially outwards from the axial center to port 310. In this embodiment, the ingress port is located on filter head 2. By locating the ingress and egress ports off axis, filter housing assembly 200 has a more robust design, with enhanced structural integrity for mounting to the filter base, and for remaining fixably in place during attachment.

Referring to FIGS. 4A-4C, in a preferred attachment scheme for filter key 5, a protrusion or rail 32 or 320 is formed on or near the center line of filter manifold 3 or 300. Protrusion or rail 32 or 320 is preferably a rectangular shaped segment extending above circular center portion 33 or 330. Protrusion or rail 32 allows for precise alignment of filter key 5, while providing a robust connection. Preferably, a dovetail shape, press fit, or friction fit interconnection between protrusion 32 and groove 51 of filter key 5 permits the user to remove and replace filter key 5. This allows for the designation of specific filter keys, and correspondingly, specific filter cartridges. Protrusion or rail 32, 320 may be integrally formed with filter manifold 3 or 300, respectively, and filter manifold 3 may be integrally formed with the filter housing top portion. Or these components may be separately fabricated and attached by bond, weld, press fit, friction fit, or other suitable means known in the art. Preferably, protrusion or rail 32, 320 has a dovetail shaped surface for slidably mating with complementary groove 51 of filter key 5.

In the embodiment depicted by FIGS. 4B and 4C, protrusion 32 may be on an extension support 34. FIG. 4B depicts a top level view of filter manifold 3, showing extension support 34 extending longitudinally or radially outward from center portion 33, along a radius. Extension support 34 supports optional shroud 4 that covers and protects filter head 2. Filter manifold 3 or 300 seats within and attaches to filter head 2.

Figure 5A:
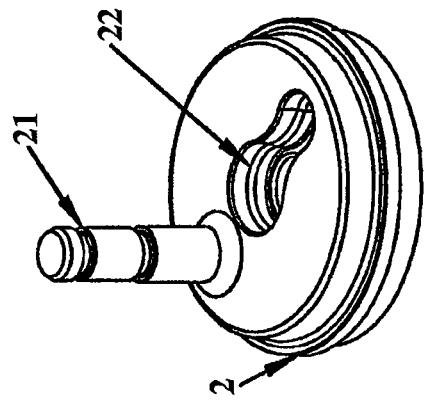
FIG. 5A is a side view of one embodiment of the filter head of the present invention.

FIG. 5A depicts a side view of one embodiment of filter head 2. Filter head 2 is shown with off-center port 21. In this manner, port 21 of filter head 2 and port 31 of filter manifold 3 are both off-center and parallel to one another about a plane that approximately intersects the center point of filter head 2. As shown in FIGS. 1, 4, and 5, a recessed portion 22 formed about the center point of filter head 2 receives center portion 33 of filter manifold 3. If extension support 34 is used with filter manifold 3, when filter manifold 3 is inserted within filter head 2, extension support 34 is situated approximately perpendicular to the plane formed by ports 21 and 31. Extension support 34 provides at each end a snap fit design for shroud 4.

Figure 5B:
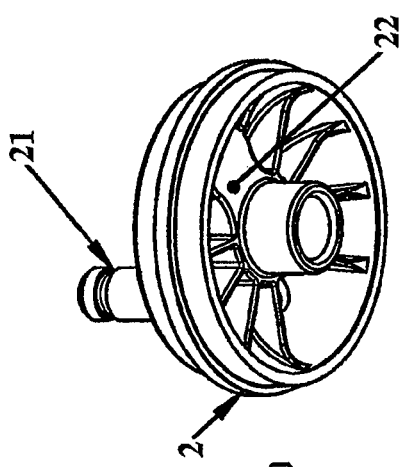
FIG. 5B is a bottom perspective view of the filter head of FIG. 5A.

FIG. 5B is a bottom perspective view of the filter head.

Figure 5C:
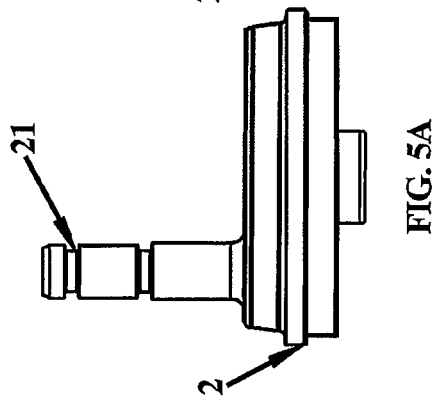
FIG. 5C is a top perspective view of the filter head of FIG. 5A.

FIG. 5C is a top perspective view of filter head 2 depicting recess portion 22.

Figure 5D:
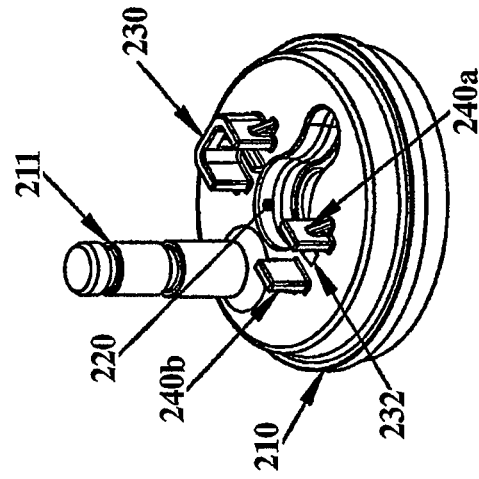
FIG. 5D is another embodiment of the filter head with a snap fit lock for the filter key.
Figure 5E:
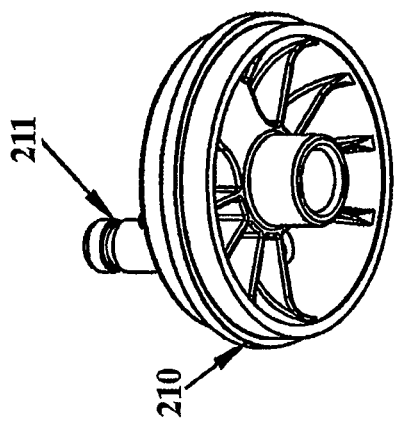
FIG. 5E is a bottom perspective view of the filter head of FIG. 5D.
Figure 5F:
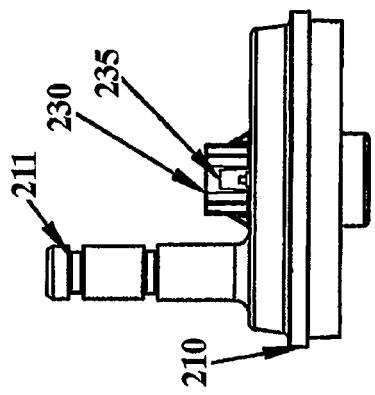
FIG. 5F is a top perspective view of the filter head depicting the aperture for receiving the filter key.

Filter head 210 depicts another embodiment as shown in FIGS. 5D-5F. In this embodiment, as depicted in the top perspective view of FIG. 5F, on the top surface of filter head 210 is a curved receiving boss or support member 230 located on one side of the center point, and two parallel, lateral support members 240a,b located opposite curved boss 230 on the other side of the center point of filter head 210. These structural support members are used to align filter key 5 to filter head 210, and help secure filter key 5. This filter head may be used in conjunction with the filter manifold 300 without extension supports, as depicted in FIG. 4A. Structural support member 230 provides a physical stop for filter key 5, which typically slides on protrusion 32 provided by filter manifold 300. Lateral support members 240a,b are used to align filter key 5, and prevent it from inadvertent shifting. FIG. 5E is a bottom perspective view of filter head 210. FIG. 5D is a side view of filter head 210.

In another embodiment, filter head 2, 210 may be integral with filter manifold 3, 310, such as for example, a one piece construction in the form of a single injected molded piece, or a two piece construction with filter manifold 3, 310 welded, fused, or otherwise permanently attached to filter head 2, 210 as a subassembly.

Figure 5G:
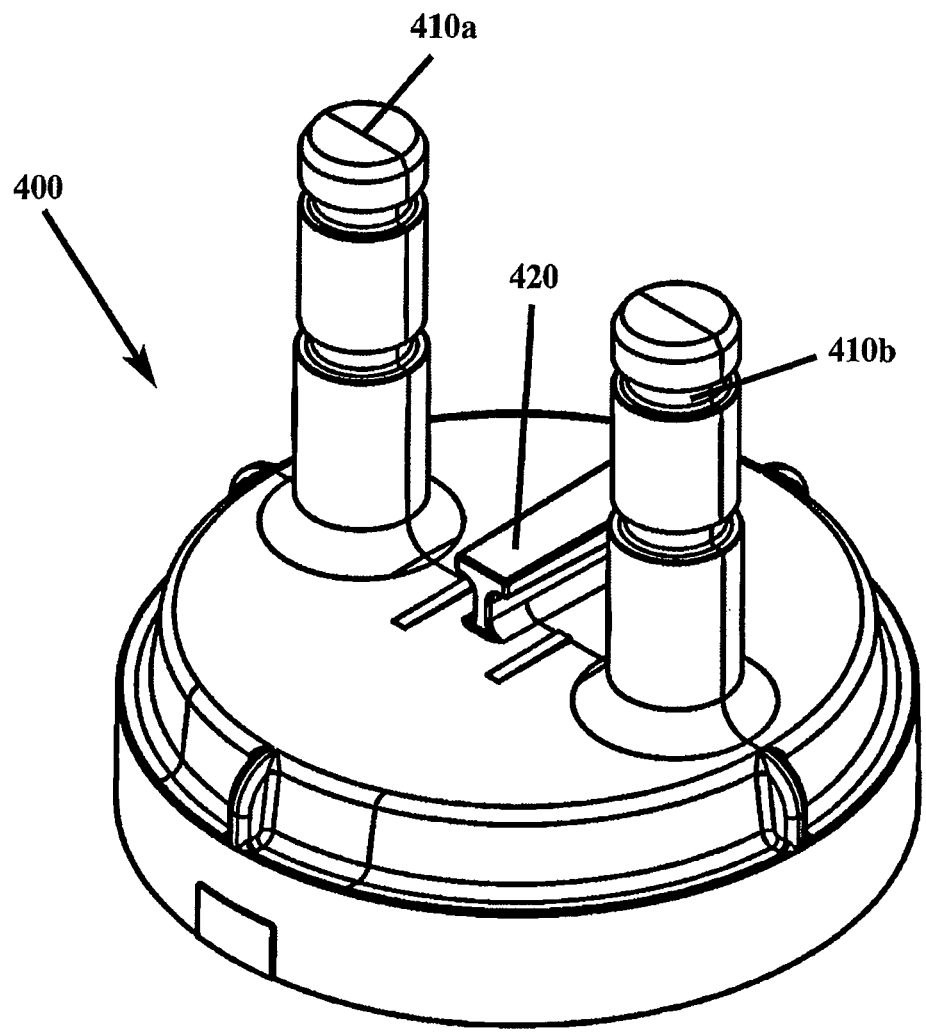
FIG. 5G depicts a one-piece or integrated filter head/filter manifold construction having ingress and egress ports for fluid flow.

FIG. 5G depicts a one-piece or integrated filter head/filter manifold construction 400 having ingress and egress ports 410a,b. Protrusion 420 is preferably a shaped segment extending above, and off axis from, the circular center of filter head 400. Protrusion 420 allows for precise alignment of filter key 5, while providing a robust connection. A dovetail shape, press fit, or friction fit interconnection between protrusion 420 and groove 51 of filter key 5 permits the user to remove and replace filter key 5.

Figure 5H:
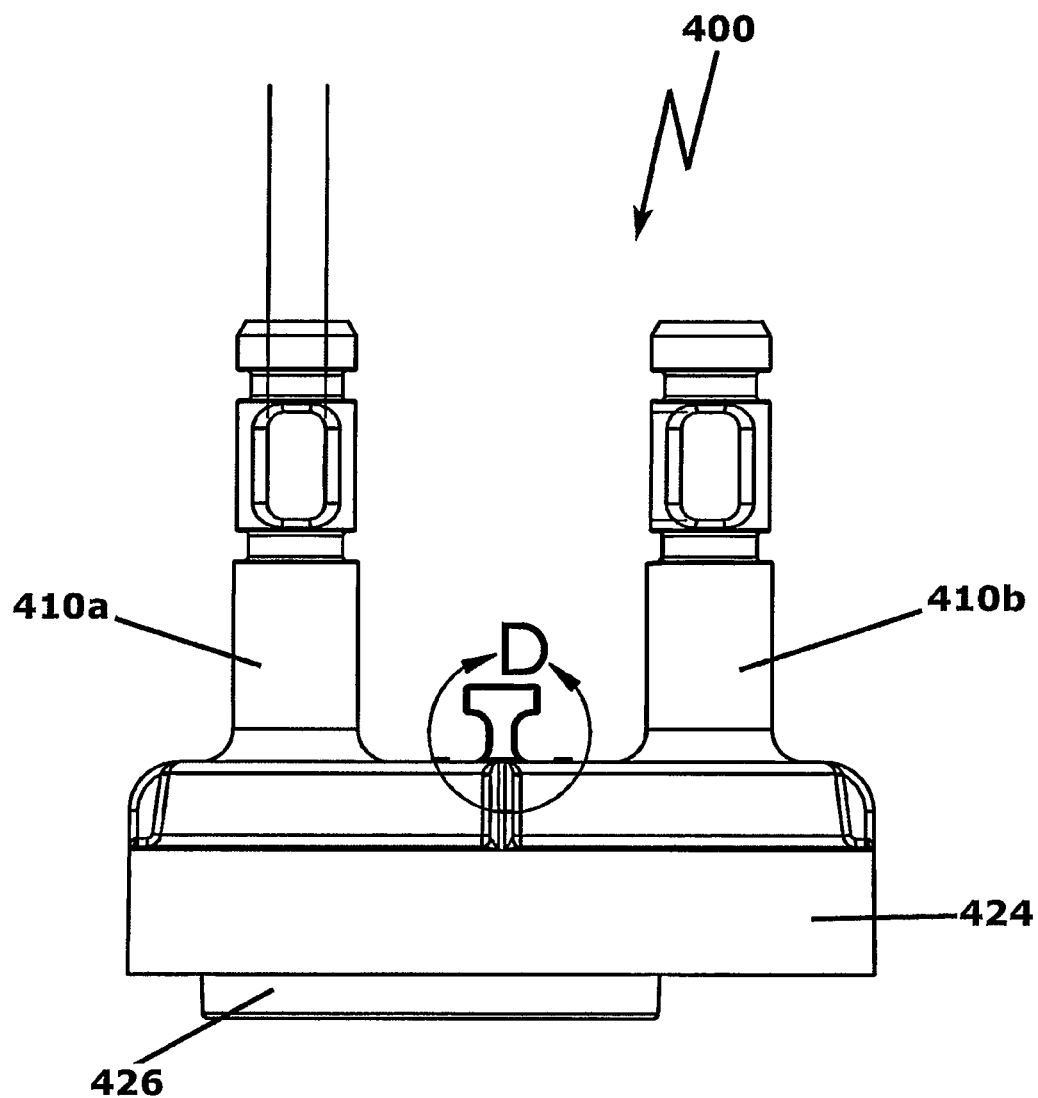
FIG. 5H is a side view of the integrated, one-piece filter head of FIG. 5G.

FIG. 5H is a side view of integrated, one-piece filter head 400. Cylindrical wall 424 is sized to receive the open end cap 6 of filter housing 1. Cylindrical wall 426 is off the axial center of filter head 400 and is configured to receive the center axial port of end cap 6, redirecting fluid flow off the axial center such that port 410b is within cylinder 426, and port 410a is outside of cylinder 426. This redirection of fluid flow performs a similar function as filter manifold 3, 310 without the need of aligning the center axial port of end cap 6 with a filter manifold aperture.

Figure 5I:
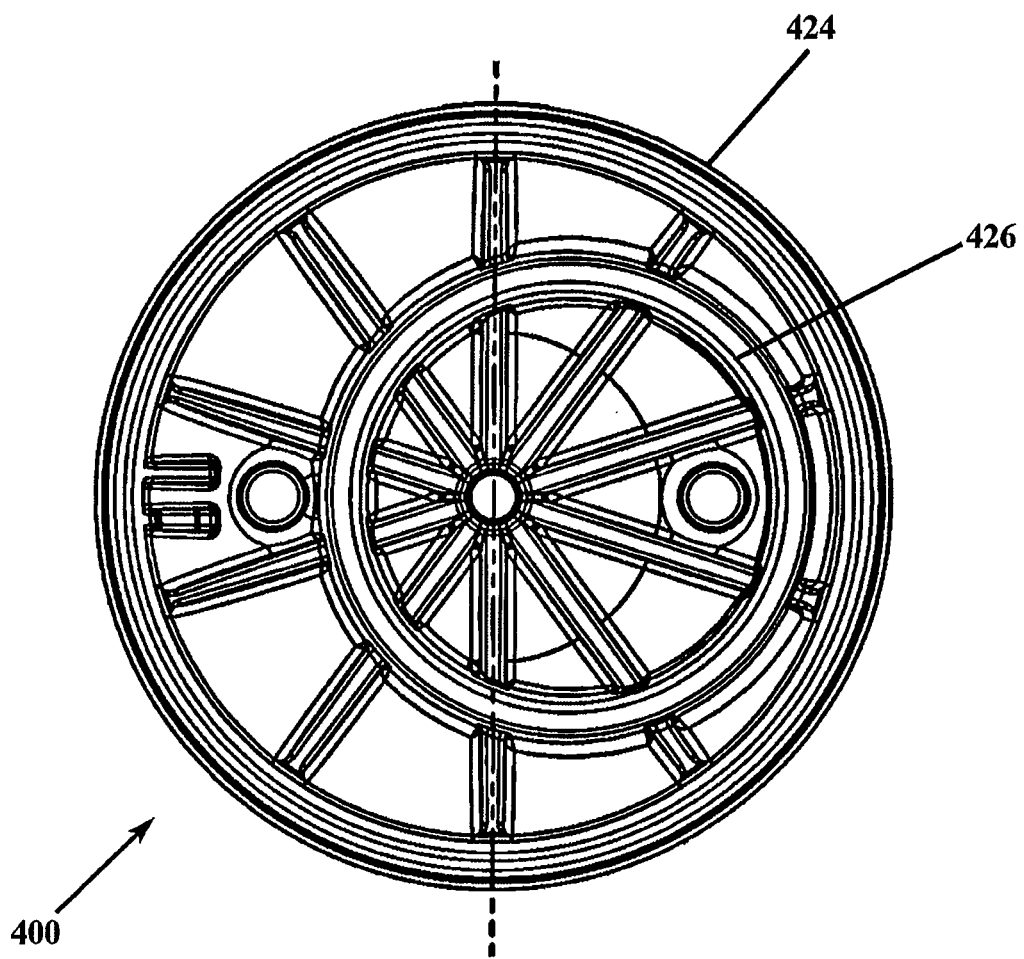
FIG. 5I is a bottom view of the integrated, one-piece filter head of FIG. 5G, depicting an off axial center cylinder for receiving an end cap port of the filter cartridge.

FIG. 5I is a bottom view of the integrated, one-piece filter head of FIG. 5G, depicting off axial center cylinder 426 for receiving a port of open end cap 6 of the filter cartridge. A comparison to FIGS. 5B and 5E which depict perspective views of the underside of filter head 2, 210 respectively, with FIG. 5I, demonstrates the absence of an axially centered cylinder for receiving the port from open end cap 6 in the integrated filter head 400 design.

Filter manifold 300 includes an off-center port 310, as well as a center portion 330 that fits securely within recess 220 of filter head 210. Protrusion 320 receives the groove from filter key 5. In this embodiment, when filter key 5 is slidably inserted within protrusion 320, structural support member 230 and lateral structural support members 240*a,b* secure filter key 5. The curved portion of structural support member 230 forces filter key 5 to be inserted in one direction only. An added boss 232, located on the top of filter head 210 and centered between lateral support members 240*a,b* may be employed to serve as a lock or snap fit for filter key 5. Additionally, in another embodiment, structural support member 230 may be formed with a small aperture 235 located directly away from the center point of filter head 210 at its base where support member 230 meets the top portion of filter head 210. This small aperture 235 is designed to receive a protruding material or locking nub or tab 53 placed at, or formed with, the corresponding end portion of filter key 5 on the lower end of a lateral side. Locking nub or tab 53 on filter key 5 is inserted within small aperture 235 on the curved portion of structural support member 230 and prevents axial removal of filter key 5 away from filter head 210. FIGS. 2A-2F show locking nub 53 located on the bottom portion of a lateral side of filter key 5. FIG. 5D is a side view of filter head 210 depicting aperture 235 for receiving filter key 5.

Filter key 5 includes at least one laterally extending finger 52, and preferably a plurality of extending fingers, as depicted in FIGS. 2A-2F. FIG. 2C is a bottom perspective view of filter key 5. In a first illustrative embodiment, filter key 5 is shown with ten laterally extending fingers 52. Fingers 52 are preferably constructed of the same material as, and integrally formed with, base 55 of filter key 5. However, the fingers may also be removably attached, and the filter key design is not limited to an integrally formed construction. The laterally extending fingers 52 may form a number of different configurations. In the illustrative embodiment, there is a uniform gap 54 between each finger 52. In other configurations, a finger may be missing on one or both sides of filter key 5, and gap 54 may be wider in some places than in others. Using a digital 1, 0 designations to indicate a finger (1) or a gap (0), it is possible to have many different configurations for a filter key. The configuration as shown in FIG. 2E would be designated on each side as 101010101. As a separate example, for a designation of 100010101, this would represent a lateral finger (1) followed by a wide gap (000), and then a finger (1) followed by a gap (0) and a finger (1) followed by another gap (0), and one last finger (1). The present invention is not limited to any particular finger/gap order. Additionally, it is not necessary for the finger/gap configuration on one side of filter key 5 to be symmetric with the finger/gap configuration on the opposite side. By having different finger/gap configurations, it is possible to make a mechanical key identifier for the specific filter housing assembly being employed. Filter key 5 may also be color-coded to facilitate identification for different filter cartridges or housing assemblies. It may also be textured, mirrored, transparent, translucent, materially modified, or having a conductively signature, or any combination thereof, for identification purposes. More importantly, aside from identification of the filter housing assembly, a particular filter key finger/gap configuration will only allow for the use of a specific filter housing assembly in a given system.

Fingers 52 of filter key 5 are strength bearing members, used to mate with, or interlock with, corresponding drive keys 123*a,b* located on longitudinal sides of floating lock 12 as depicted in FIG. 3. There must be at least one drive key on floating lock 12 that corresponds to, and lines up with, at least one finger on filter key 5, so that when filter key 5 is inserted to mate with floating lock 12, the drive keys slidably contact the fingers and floating lock 12 is shifted longitudinally an incremental amount to allow fingers 52 on filter key 5 to traverse between the gaps 122 on floating lock 12. Once fingers 52 have passed between the corresponding gaps on floating lock 12, which is slidably restrained under tensional forces, floating lock 12 is partially returned towards its original position by the tensional retraction forces so that at least one finger on filter key 5 aligns or interlocks with at least one drive key on floating lock 12, and the alignment resists any direct outward, axial extraction forces.

Each finger 52 of filter key 5 includes a slanted face 58 as depicted in FIGS. 2A and 2F. These angled features are made to slidably contact complementary slanted edge or angled features 121*a,b* of drive keys 123*a,b* of floating lock 12 shown in FIGS. 3A and 3E. During insertion of filter key 5, the sliding contact of the angled feature of the filter key's fingers transversely shifts floating lock 12 off of its initial position, and allows the fingers of filter key 5 to be inserted within gaps 122 between the drive keys 123*a,b*.

Figure 3A:
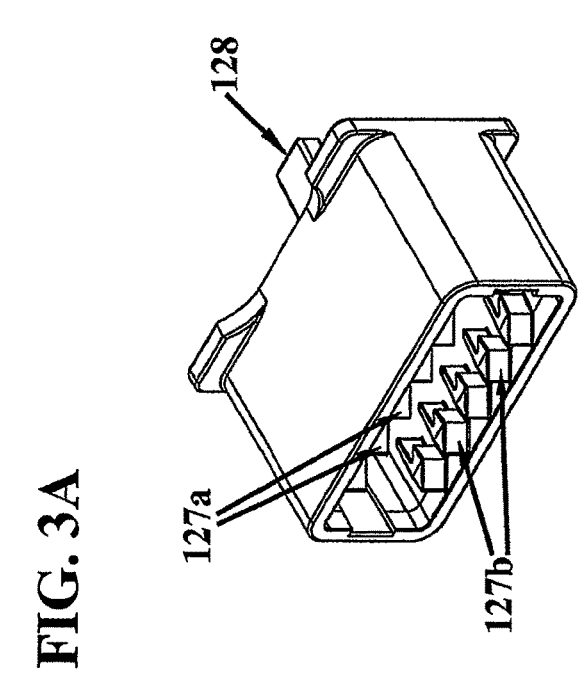
FIG. 3A depicts a perspective view of one embodiment of the floating lock or sliding lock of the present invention.
Figure 3B:
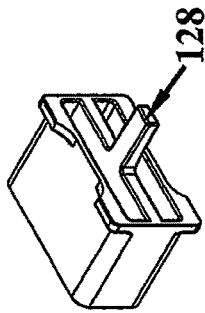
FIG. 3B is a perspective view from the opposite side of the floating lock of FIG. 3A.
Figure 3C:
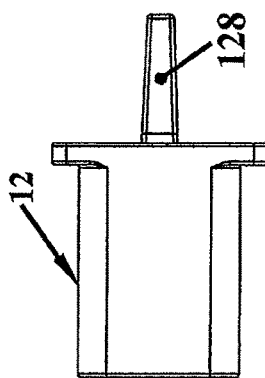
FIG. 3C is a lateral side view of the floating lock of FIG. 3A.
Figure 3E:
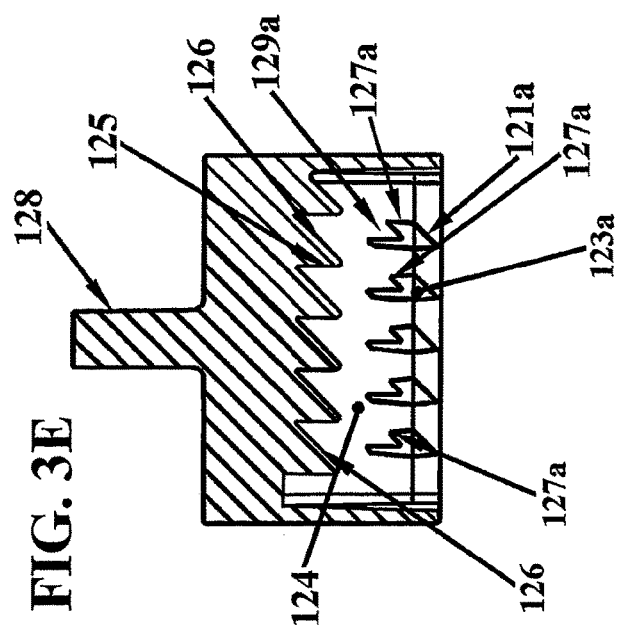
FIG. 3E depicts cross-sectional longitudinal side view of the floating lock of FIG. 3A.
Figure 3D:
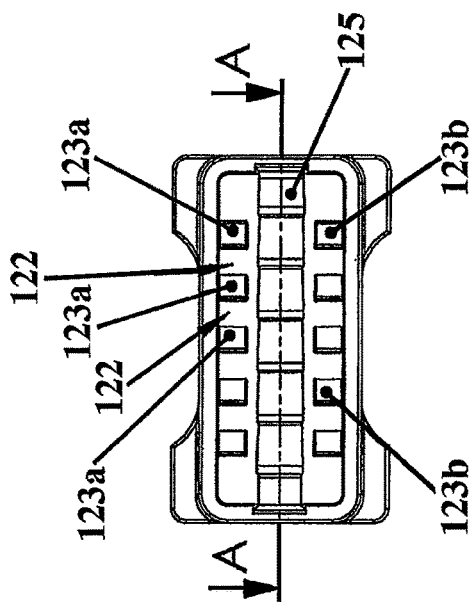
FIG. 3D depicts a top view of the floating lock of FIG. 3A.

A perspective view of floating lock 12 is depicted in FIGS. 3A and 3B. Floating lock 12 has angled-faced fingers, protrusions, or drive keys 123*a,b* and gaps 122 that may reciprocally correspond to fingers 52 and gaps 54 located on filter key 5. It is not necessary for the drive key/gap configuration of floating lock 12 to be exactly complementary to the finger/gap configuration of filter key 5. It is only necessary that floating lock 12 is able to fully receive the inserting filter key 5 when filter housing assembly 200 is axially inserted into filter base 100. Each drive key 123*a,b* of floating lock 12 is shaped with a receiving wedge 129*a,b*, respectively, opposite slanted edge 121*a,b* to capture fingers 52 of filter key 5. Fingers 52 may have a cross-sectional diamond shape to facilitate the capture by the drive key receiving wedge 129*a,b*. Drive keys 123*a,b* are placed on at least one longitudinal side of floating lock 12, as depicted in FIGS. 3D and 3E. Underneath and centered between drive keys 123*a,b* is a row of position stops 125. Position stops 125 preclude fingers 52 from extending any further during insertion. There need not be a position stop 125 for each drive key 123*a,b*, provided there is at least one position stop 125 to prohibit over insertion of filter key 5. Position stops 125 also include a slanted or angled face 126 for slidable contact with slanted face 58 of fingers 52 on filter key 5. Position stops 125 are shown as a row of jagged edges, but do not have to correspond one-for-one with drive keys 123*a,b*.

Upon insertion, when fingers 52 of filter key 5 contact drive keys 123*a,b*, floating lock 12 shifts away from its initial position, against retraction forces, and moves according to the contacting angled edges 58 and 121. Once wings 56*a,b* of fingers 52 clear lip 127*a,b* of drive keys 123*a,b*, floating lock 12 is not prohibited from reacting to the retraction forces, and moves slightly back, towards its original position where diamond shaped wings 56*a,b* are then trapped by receiving wedges 129a,b. This position locks filter key 5 to floating lock 12 resisting any direct axial extraction force.

There is a gap or space 124 between the bottom most portion of drive key 123a,b and top most portion of position stop 125. Upon extraction, when wings 56a,b of fingers 52 are pushed within this gap or space, there is no structure preventing floating lock 12 from responding to the tensional retraction forces acting on it. Thus, floating lock 12 is free to respond to the retraction forces, and will tend to move towards its initial position. This will align fingers 52 of filter key 5 within gaps 122 of floating lock 12 and allow for easy extraction of filter housing 200.

In order to extract filter housing assembly 200, a user again pushes axially inwards on the filter housing assembly, which releases wings 56a,b on filter key 5 from drive keys 123a,b. This frees floating lock 12 to return to its original position, and locates fingers 52 on filter key 5 at gaps 122 of floating lock 12. Filter housing assembly 200 can now be freely extracted from filter base 100. Resilient members 1110 within shut-off stanchions 1101a,b of non-floating port 11 assist in pushing or extracting filter housing assembly 200 away from filter base 100.

Figure 9B:
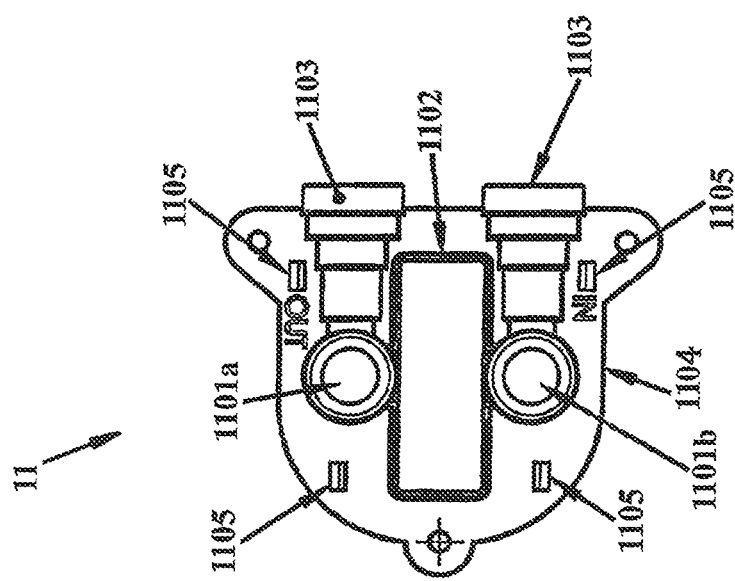
FIG. 9B is a top plan view of the non-floating port of FIG. 9A.
Figure 9A:
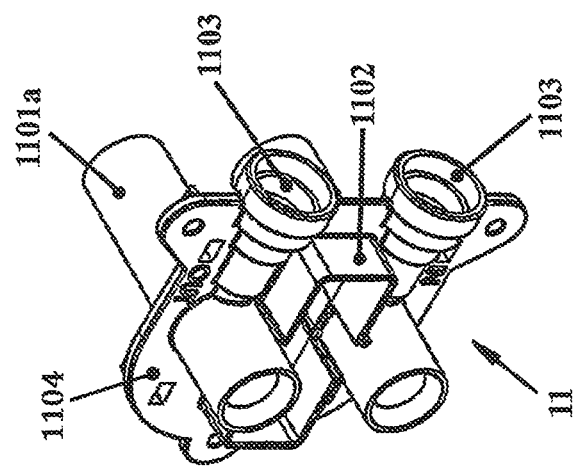
FIG. 9A is a perspective view of a non-floating port of the present invention.
Figure 11:
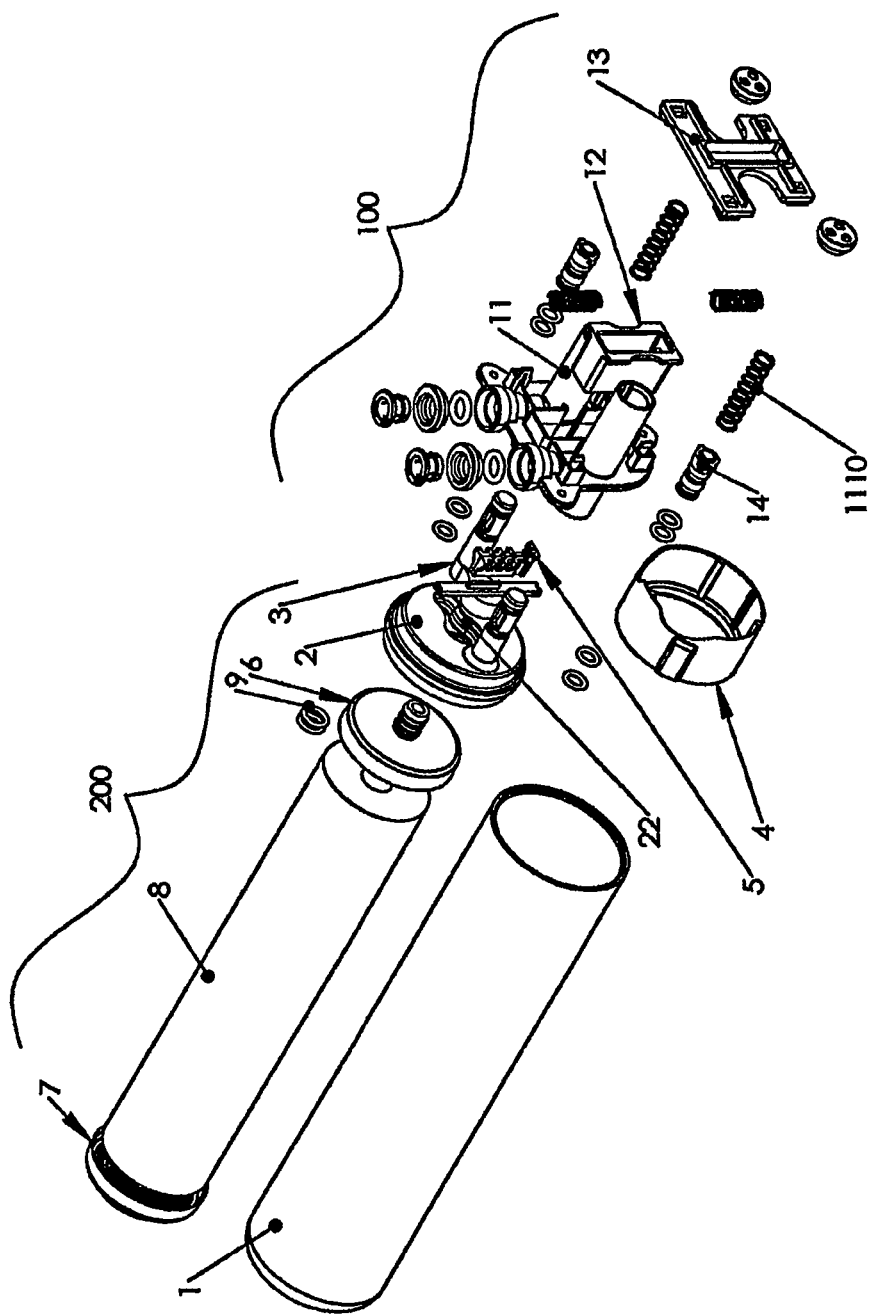
FIG. 11 is an exploded view of a filter assembly of the present invention, showing a filter key having a boss, connected to a filter manifold having extension supports.

FIG. 9A is a perspective view of non-floating port 11, which works in tandem with rear plate 13 or rear plate 1300 to hold floating or sliding lock 12 in place while allowing it to freely move longitudinally off its center position and back to its center position during the insertion and extraction of filter housing assembly 200. As discussed further herein, the base platform 1104 of non-floating port 11 will also hold floating lock 1200 and floating lock 1212 of FIG. 8. For simplicity, reference is made chiefly to the interaction of non-floating port 11 with floating lock 12, although the applicability of non-floating port 11 includes usage with floating lock 1200 and 1212 as well. Non-floating port base platform 1104 includes a protruding encasement 1102, larger than floating lock 12, and made to enclose floating lock 12 therein. Encasement 1102 prevents over-travel of floating lock 12, and protects it when installed from extraneous, unintended movement.

FIG. 9B is a top plan view of non-floating port 11. Stanchions 1101a,b are located on opposite sides of encasement 1102 and extend through base platform 1104. Each ingress/egress stanchion 1101a,b has an upper extension portion extending perpendicularly upwards with respect to a top surface of base platform 1104 in an axial direction and a lower stanchion portion extending downwards with respect to base platform 1104 in the axial direction. Ports 1103 represent the ingress and egress ports for the fluid. Shut-off stanchions 1101a,b include shutoff plugs 14, which act as valve seals to stop fluid flow when the filter cartridge is being removed. Shut-off stanchions 1101a,b are preferably cylindrical in shape, containing spring activated, o-ring sealed plugs for sealing the ingress and egress lines during filter cartridge removal. In an embodiment, rear plate 13 is snap fitted into non-floating port 11. In order to accommodate this, snap fittings 1105 are shown on non-floating port 11 that receive a corresponding fitting 135 on rear plate 13. Referring to FIG. 1, floating lock 12 is supported by non-floating port 11 and rear plate 13.

FIG. 10A is a top plan view of one embodiment of rear plate 13 of the present invention.

FIG. 10B depicts a bottom perspective view of rear plate 13. Rear plate 13 secures floating lock 12 within a support structure in non-floating port 11. Rear plate 13 is preferably attached by snap fit to non-floating port 11, although other attachment schemes known in the art may be easily employed, such as bonding, welding, and assorted mechanical fasteners. Rear plate 13 is formed with extensions 132 on each end, and shaped gaps 133 therebetween. Gaps 133 are shaped to go around shut-off stanchions 1101a,b of non-floating port 11. In this embodiment, rear plate 13 includes a center aperture 131 that allows for longitudinal movement of floating lock 12. Floating lock 12 may include an extension member opposite the face configured with fingers and gaps, in order to permit resilient components, such as helical or torsion springs to act upon it. FIGS. 3C and 3E are side views of the floating lock showing extension member 128. FIG. 3B is a perspective view of the floating lock 12 with extension member 128. FIG. 8E depicts floating lock 1212 with extension member 1280. In these embodiments, the extension member is acted upon by resilient devices held by the rear plate.

FIG. 10C is a top plan view of another embodiment of the rear plate 1300 of the present invention. In this embodiment, the topside of rear plate 1300 includes a domed, slotted cover 1302 over the center aperture. Cover 1302 is formed to encase springs or other resilient members about the extension member 128 extending from floating lock 12. Dome 1302 includes a slot 1304 that is made to receive the extension member 128 from floating lock 12. Slot 1304 helps retain linear movement of floating lock 12 inside dome 1302. In this embodiment, two complementary resilient members, such as springs, would reside on each side of the extension member 128 of floating lock 12. One resilient member preferably applies force on the floating lock extension member in one direction, while the other resilient member applies force to the floating lock extension member in the opposite direction. In this manner, no matter which way floating lock 12 is moved or shifted, a retraction force presents itself to return floating lock 12 to its original, centered position.

At all times during insertion, the filter housing assembly is under extraction forces that tend to push the housing out of the filter base. These extraction forces result from resilient members in each shut-off stanchion 1101a,b of non-floating port 11 (shown in FIG. 9B) that force shutoff plugs 14 into position in order to block the ingress and egress ports. Preferably, the extraction forces on shutoff plugs 14 are provided by a spring 1110 in each port, although other resilient members may be used to provide a similar result. Inserting the filter housing assembly into the filter base works against these extraction forces, and pushes shutoff plugs 14 further up each shut-off stanchion 1101a,b of non-floating port 11. This allows for fluid ingress, while keeping the filter housing assembly under the constant extraction force.

Protective port shroud 4 may be placed over filter head 2, to protect the floating lock 12 and filter key 5 mechanism from damage and debris. Shroud 4 is preferably supported by the extension supports on the filter manifold.

Figure 6A:
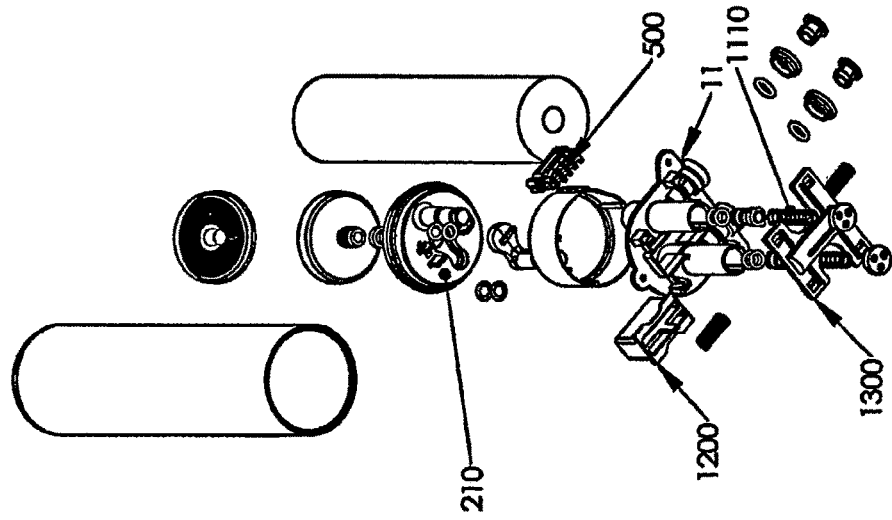
FIGS. 6A and 6B are exploded views of a second embodiment of the filter assembly of the present invention, showing a filter key having an extended boss.
Figure 6B:
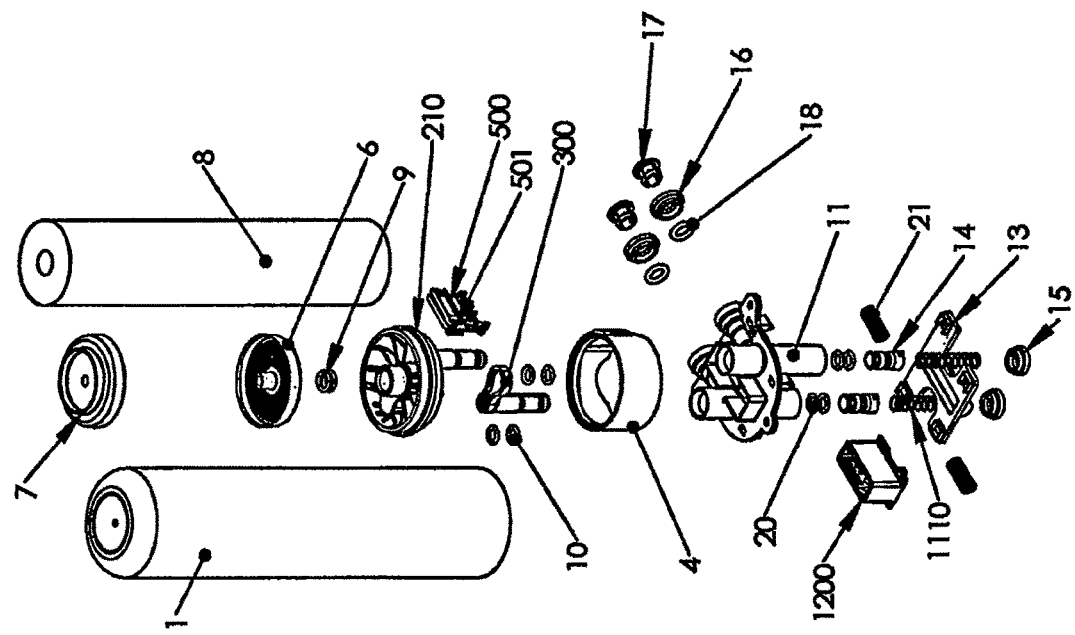

FIGS. 6A and 6B are exploded views of another embodiment of the filter assembly of the present invention, showing the combination of filter manifold 300, filter key 500, and filter head 210. Filter key 500 is depicted without a locking nub or tab; however it may include a locking nub to facilitate attachment to the filter head. FIG. 7F depicts filter key 590 with locking nub or tab 501. Locking nub 501 is located at the base of filter key 590. In this embodiment, filter key 500 or 590 and filter manifold 300 are modified such that floating lock 1200 or 1212 of FIG. 8 is slidably shifted by the interaction wings 560a,b of an extended boss 550 on filter key 500 or 590 with drive keys 1210a,b of floating lock 1200.

Filter key 500 or 590 is inserted within floating lock 1200 through the axial insertion of the filter housing assembly into the filter base. Hammerhead shaped wings 560a,b on fingers 520 of filter key 500 and drive keys 1210a,b on floating lock 1200 or 1212 slidably contact one another, causing a transverse motion of floating lock 1200 or 1212 perpendicular to the axial motion of insertion. In this manner, floating lock 1200 or 1212 is shifted longitudinally, in a direction radially relative to the filter housing assembly axis. Fingers 520 of filter key 500 are positioned within the gaps 1220 on floating lock 1200 or 1212. Once filter key 500 or 590 is inserted, floating lock 1200 or 1212 is returned partially towards its original position by retracting tensional forces, preferably by complementary spring forces, so that the fingers on floating lock 1200 or 1212 align directly with fingers 520 on filter key 500 or 590, thus preventing a direct extraction force from removing the filter housing assembly from the filter base.

FIG. 7F depicts a top perspective view of filter key 590. At one end of filter key 590 is an upwardly extended angled boss 550. Boss 550 rises above horizontal plane 570 created by the top portion of fingers 520, and is angled toward fingers 520, with its highest point at one end of filter key 500. Boss 550 angles downward from its highest point towards fingers 520. Preferably, boss 550 is an upwardly facing triangular or wedge shaped design having wings 560a,b for interaction with drive keys 1210a,b, respectively, on floating lock 1200.

FIG. 7E depicts an end view of filter key 500 showing a hammerhead shaped boss 550 rising above plane 570 created by fingers 520, and wings 560a,b extending laterally from boss 550 resembling what may be considered a hammerhead shape. The purpose of wings 560a,b is to contact corresponding angled drive keys 1210a,b on floating key 1200.

A perspective view of the complementary floating lock 1200 is depicted in FIG. 8A. The only difference between floating lock 1200 of FIG. 8A and floating lock 1212 of FIG. 8E is the addition of an extension member 1280 on floating lock 1212. Floating lock 1200 has fingers 1230a,b and gaps 1220 that may reciprocally correspond to fingers 520 and gaps 540 located on filter key 500 or 590. It is not necessary for the finger/gap configuration of floating lock 1200 to be exactly complementary to the finger/gap configuration of filter key 500 or 590. It is only necessary that floating lock 1200 is able to fully receive the inserting filter key 500 when the filter housing assembly is axially inserted into the filter base. Furthermore, once floating lock 1200 is subjected to retraction forces acting to return it partially towards its original position, it is necessary that at least one finger on filter key 500 or 590 vertically align with at least one finger on floating lock 1200 or 1212 preventing any extraction without further shifting of floating lock 1200 or 1212.

Using floating lock 1200 and filter key 500 as illustrative examples, upon slidable contact of wings 560a,b on filter key 500 and drive keys 1210a,b on floating lock 1200, floating lock 1200 moves in a transverse motion, perpendicular to the axial motion of insertion. In this manner, floating lock 1200 is shifted longitudinally, in a direction radially relative to the filter housing assembly axis. Fingers 520 of filter key 500 are positioned within the gaps 1220 on floating lock 1200. Once filter key 500 is inserted, floating lock 1200 is returned partially towards its original position by retracting tensional forces, preferably by complementary spring forces, so that the fingers on floating lock 1200 align directly with fingers 520 on filter key 500, thus preventing a direct extraction force from removing the filter housing assembly from the filter base.

Fingers 1230a,b are preferably constructed of the same material as floating lock 1200 and integrally formed therewith. However, fingers 1230 may also be removably attached, and the floating lock design is not limited to an integrally formed construction. Additionally, the present invention is not limited to any particular finger/gap order. It is not necessary for the finger/gap configuration on one side of floating lock 1200 to be symmetric with the finger/gap configuration on the opposite side. Floating lock 1200 is responsive to tensional forces, such as complementary springs acting on it from two separate directions to provide resistance longitudinally. Floating lock 1200 effectively moves longitudinally when acted upon by filter key 500, and is forced to return partially towards its original position after fingers 520 of filter key 500 have traversed through gaps 1220. Upon partial retraction, fingers 520 are aligned behind or underneath fingers 1230 of floating lock 1200. FIG. 8B is a top view of floating lock 1200 showing laterally extending fingers 1230a,b and adjacent gaps 1220 between the fingers.

FIG. 8C is a cross-sectional view of floating lock 1200, depicting drive key 1210a, which is located at one end of floating lock 1200 on longitudinal or side panel 1240. Drive key 1210a is opposite a similar drive key 1210b (not shown), which is located on the opposite longitudinal panel of floating lock 1200. Both drive keys are designed to have an angled face for slidably interacting with wings 560a,b of boss 550 on filter key 500. Each drive key is preferably integrally fabricated with floating lock 1200; however, the drive keys may be fabricated separately and attached to the longitudinal panels of floating lock 1200 by attachment means known in the art. As shown in FIG. 8C, below drive key 1210a is a position key or physical stop 1250, preferably formed with the supporting lateral wall 1260 of floating lock 1200. As shown in FIG. 8B, position key 1250 is situated between drive keys 1210a,b. Position key 1250 may be integrally formed with lateral wall 1260, or may be separately attached thereto by any acceptable means in the prior art, such as bonding, welding, gluing, press fitting, and the like. Position key 1250 acts as a physical stop to ensure against over travel of floating lock 1200. Position key 1250 is situated below drive keys 1210a,b by a distance designed to accommodate the insertion of boss 550 of filter key 500. Upon insertion of filter key 500 into floating lock 1200, boss 550 traverses through gap 1270 in floating lock 1200 formed by the space between drive keys 1210a,b. Wings 560a,b of boss 550 extend outward relative to the width of boss 550, traversing between lateral wall 1260 and drive keys 1210a,b. In this manner, wings 560a,b retain floating lock 1200 from retracting back to its original position while boss 550 is being inserted. At all times, floating lock 1200 is under the retraction force of resilient members, such as tandem springs, or the like, tending to keep floating lock 1200 its original position, which is preferably a centered position. During insertion of filter key 500, wings 560a,b interact with drive keys 1210a,b to shift floating lock 1200 longitudinally off-center while under the resilient retraction forces. Upon full insertion, when boss 550 reaches and contacts position key 1250, wings 560a,b are no longer held by drive keys 1210a,b because the length of drive keys 1210a,b is shorter than the length of boss 550. At this point in the insertion process, the tensional retraction forces shift floating lock 1200 towards its original position.

Once wings 560a,b reach position key 1250, and the user releases the insertion force initially applied on the filter housing assembly, the extraction forces from shutoff plug springs 1110 dominate. These forces push the filter housing assembly axially outwards, away from floating lock 1200. Since wings 560a,b are no longer bound between drive keys 1210a,b and lateral wall 1260, floating lock 1200 will tend to shift longitudinally, partially towards its original position as filter key 500 moves slightly axially outwards. At this point, wings 560a,b interact with edge angles 1280a,b to push away from the center position, shifting filter key 500, and combining or contacting with face 1300a,b to keep the filter housing from retracting. FIG. 8D depicts an exploded view of drive key 1210a with edge angle 1290a and face 1300a.

Fingers 520 of filter key 500 are now aligned with fingers 1230 of floating lock 1200 and remain in contact in a vertical plane in the axial direction, prohibiting extraction of the filter housing assembly from the filter base.

FIGS. 12A-12E present yet another embodiment of a filter housing assembly 600, having a housing 610 with a substantially cylindrical body 612 and a top portion 614 for forming a fluid-tight seal with the body. A strengthening rib 613 runs along the length of the cylindrical body 612, parallel to a longitudinal axial center line 616. The top portion 614 is depicted as substantially dome-shaped to facilitate the filter housing assembly as a pressurized vessel; however, it may be a flat surface if design constraints require. The cylindrical body 612 and housing top portion 614 share the longitudinal axial center line 616. A protrusion 618 extends in the axial direction upwards from top portion 614, and outwards in a radial direction about the axial center 616. Dimensionally, the protrusion 618 extends upwards approximately 0.15-0.35 inches—and preferably 0.24 inches—from the top surface of the housing top portion 614. Housing 610 may hold a filter media therein for the filtration of fluids, may act as a sump, or may act as a bypass filter cartridge having no filtration media. Housing 610 is further adapted to receive a connection assembly 665 which consists of an electronic circuit component 660 and a housing 662 for receiving said electronic circuit component therein. Electronic circuit component 660 is exemplified in FIGS. 12-13 and in the below description as a printed circuit board 660, but other electronic circuit components may be used with the filter housing assembly of the present invention, including but not limited to: microcontrollers, microprocessors, microchips (such as erasable programmable read-only memories ("EPROMs")), or any other type of analog, digital, or mixed signal integrated circuit ("IC") technology.

As shown in FIGS. 12A-12E, an ingress port 620 is demarcated into three distinct segments: a first or top segment 622, a second or middle segment 623, and a third or bottom segment 624. The third or bottom segment 624 extends vertically upwards in a longitudinally axial direction from the surface of housing top portion 614 substantially parallel to the axial center line 616. The ingress port bottom segment 624 is separated from middle segment 623 by seal 628. The ingress port top segment 622 extends from the ingress port middle segment 623 upwards to the topmost surface of the port, and is separated from middle segment 623 by seal 627. Seals 627 and 628 prohibit fluid exiting ingress port middle segment's aperture or cavity 640a from contacting the outer surface of the ingress port top and bottom segments 622, 624, respectively, once the ingress port is inserted within a receiving filter base stanchion. Seals 627 and 628 provide a circumferential press-fit or sealing force against the inner cylindrical wall of the stanchions of the filter base (not shown). Seals 627, 628 are held in place on the ingress port typically by insertion into a groove within the ingress port cylindrical outer surface, such that a diameter D1 of the outermost seal radial extension is slightly greater than the inner wall diameter of the receiving stanchion, allowing the resilient, compressible seals to be compressed by the inner wall of the receiving stanchion upon insertion.

In at least one embodiment, ingress port middle segment 623 has a varying diameter D2 unequal to, and less than D1, such that the ingress port middle segment 623 is formed having an outer surface contour to allow for fluid to flow around the middle segment 623 after the ingress port 620 is inserted into its respective stanchion. Fluid exiting the filter base stanchion is contained by and between seals 627, 628 and the circumferential stanchion inner wall. The fluid traverses around the ingress port middle segment and enters the ingress port middle segment aperture or cavity 640a.

In the embodiment depicted in FIG. 12, the outer surface contour of ingress middle segment 623 is depicted in the form of an hourglass shape having a smaller diameter at its center than at either the topmost or bottommost points of the middle segment closest to the seals 627, 628. The ingress port middle segment's body may be formed of other shapes as well, such as a smaller cylindrical shape having a diameter less than D1, a rectangular or triangular segment, or cone-shaped architecture, wherein the middle segment 623 has at least one area where its measured diameter is less than diameter D1, providing an annular space for fluid to flow around the middle segment structure to allow fluid, exiting the filter base input port into the stanchion to enter the ingress port middle segment's aperture or cavity 640a.

Preferably, ingress port 620 is substantially cylindrical at its top and bottom segments to correspond to the cylindrical cavity of its respective receiving stanchion. The measurements of the outermost surface contour of ingress port 620 at the seals 627, 628/stanchion inner wall interface, which is identified by diameter D1, may be between 0.25-0.45 inches—and optionally 0.36 inches—while the ingress middle segment diameter D2 of ingress port 620 may be between 0.2-0.4 inches, and optionally 0.28 inches. The middle segment diameter D2 is less than diameter D1 and the diameter of the receiving stanchion to achieve fluid flow about and around the ingress port middle segment from the exit port of the stanchion on one side to the input aperture 640a of the middle segment to the other side. A fluid seal is still maintained during such instances of fluid flow, such that fluid is prohibited from contacting the outer surface of the ingress port top or bottom segments. This allows for the outer surface contour of ingress middle segment 623 to be less than, and within, the compressed sealing diameter D1 at the filter base's stanchion inner wall.

An egress port 630 similarly having a substantially cylindrical body 631 with a first or top segment 632, a second or middle segment 633, and a third or bottom segment 634, extends vertically upwards in a longitudinally axial direction from the top surface of housing top portion 614 substantially parallel to top portion axial center 616. The egress port top segment 632 extends from its topmost point downwards to the egress port middle segment 633, and is separated from middle segment 633 by a seal 638. The egress port bottom segment 634 extends from housing top portion 614 upwards to the egress port middle segment 633, and is separated from middle segment 633 by seal 637. Seals 637, 638 prohibit fluid exiting the egress port middle segment 633 aperture or cavity 640b from contacting the outside surface of egress port top and bottom segments 632, 634, respectively. Seals 637, 638 provide a circumferential press-fit or sealing force against the inner cylindrical wall of the receiving stanchion of the filter base (not shown). Seals 637, 638 are held in place on the egress port typically by insertion within a groove on the egress port outer wall surface, such that a diameter D3 of the outermost seal radial extension is slightly greater than the inner wall diameter of the receiving stanchion allowing the resilient, compressible seals to be compressed by the inner wall of the receiving stanchion upon insertion. In a similar fashion as the ingress port, the egress port middle segment 633 may be formed in other shapes that allow fluid to flow around the middle segment when the middle segment is placed within the receiving filter base stanchion.

In the embodiment depicted in FIG. 12, the outer surface contour of egress middle segment 633 is depicted in the form of an hourglass shape having a smaller diameter D4 at its center than at either the topmost or bottommost points of the middle segment closest the seals 637, 638. The egress port middle segment's body may be formed of other shapes as well, such as a smaller cylindrical shape having a diameter less than D3, a rectangular or triangular segment, or cone-shaped architecture, wherein the middle segment 633 has at least one area where the surface contour radial extension remains within the constraints of diameter D3 to allow fluid, exiting egress port middle segment's aperture or cavity 640b and contained by seals 637, 638 and the circumferential stanchion inner wall, to flow around the egress port middle segment to the opposite side for input into the filter base from an aperture in the receiving stanchion.

The ingress port segments 622-624 and egress port segments 632-634 may each have outer surface contours separate and distinct from one other. In the alternative, ingress port segments 622-624 and egress port segments 632-634 may have substantially similar outer surface topologies. In any case, the respective middle segments will have an outer surface topology (e.g., the outer diameter in a substantially cylindrically shaped embodiment) that has an outer surface contour with a diameter or width that is less than the inner wall of the receiving filter base stanchion by an amount sufficient to create an annular gap that allows fluid to flow around and about the middle segments between their respective upper and lower seals.

The measurements of outermost diameter D3 of egress port 630 at the seal/stanchion inner wall interface may be between 0.25-0.45 inches—and optionally 0.36 inches—while the egress middle segment 633 diameter D4 of egress port 630 may be between 0.2-0.4 inches, and optionally 0.28 inches. The middle segment smaller radial extension D4 is less than diameter D3 to achieve fluid flow about and around the egress port middle segment. This allows for the outer surface contour radial extension of ingress middle segment 623 to be less than the compressed sealing diameter at the manifold's stanchion inner wall.

Ingress port 620 and egress port 630 both include aperture or cavity 640a,b located on their respective middle segments 623, 633 for the passage of fluid. The ingress port and egress port apertures or cavities 640a,b are exposed in a direction facing away from the filter base stanchion apertures that are in fluid communication with apertures 640a,b. The opposing placement of the apertures is helpful because upon extraction of the filter cartridge, if ingress and egress apertures 640a,b are in a direction facing the filter base stanchion apertures (defined simply as a means of convention as a forward direction), any fluid that drains from apertures 640a,b may drip upon the electronics and electronic surfaces populated on the electronic circuit component or printed circuit board 660 located forward of the filter key in a PCB housing 662. Once the filter housing 610 is installed in the filter base or manifold, the cavities 640a,b of the ingress and egress ports are designed to be facing away from the filter base ports (not shown). Water flowing through housing assembly 600 thus enters and exits the cavities 640a,b, respectively, flows around the middle segments 623, 633 of the ingress and egress ports within the manifold stanchions, and continues into the ports. The variable radial extensions or diameters D2, D4 of the middle segments 623, 633, respectively, allows for the water to flow around the ingress and egress port middle segments within the stanchion's cylindrical cavity without building undue pressure that could otherwise force a leak through the seals 627, 628, 637, 638 and onto the filter housing assembly 600, which would otherwise cause damage to the electronics disposed on the printed circuit board 660 as further described below.

Figure 12A:
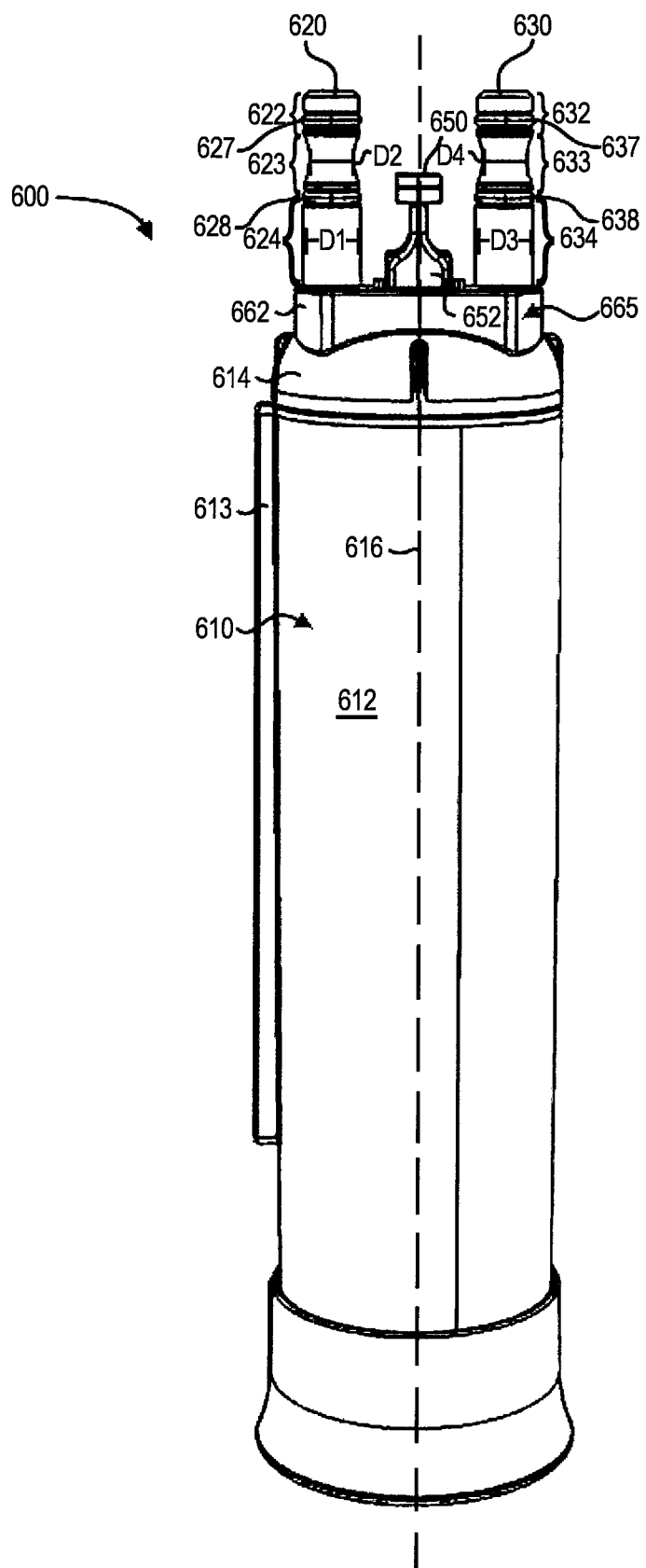
FIG. 12A is a front elevational view of another embodiment of a filter assembly of the present invention.
Figure 12B:
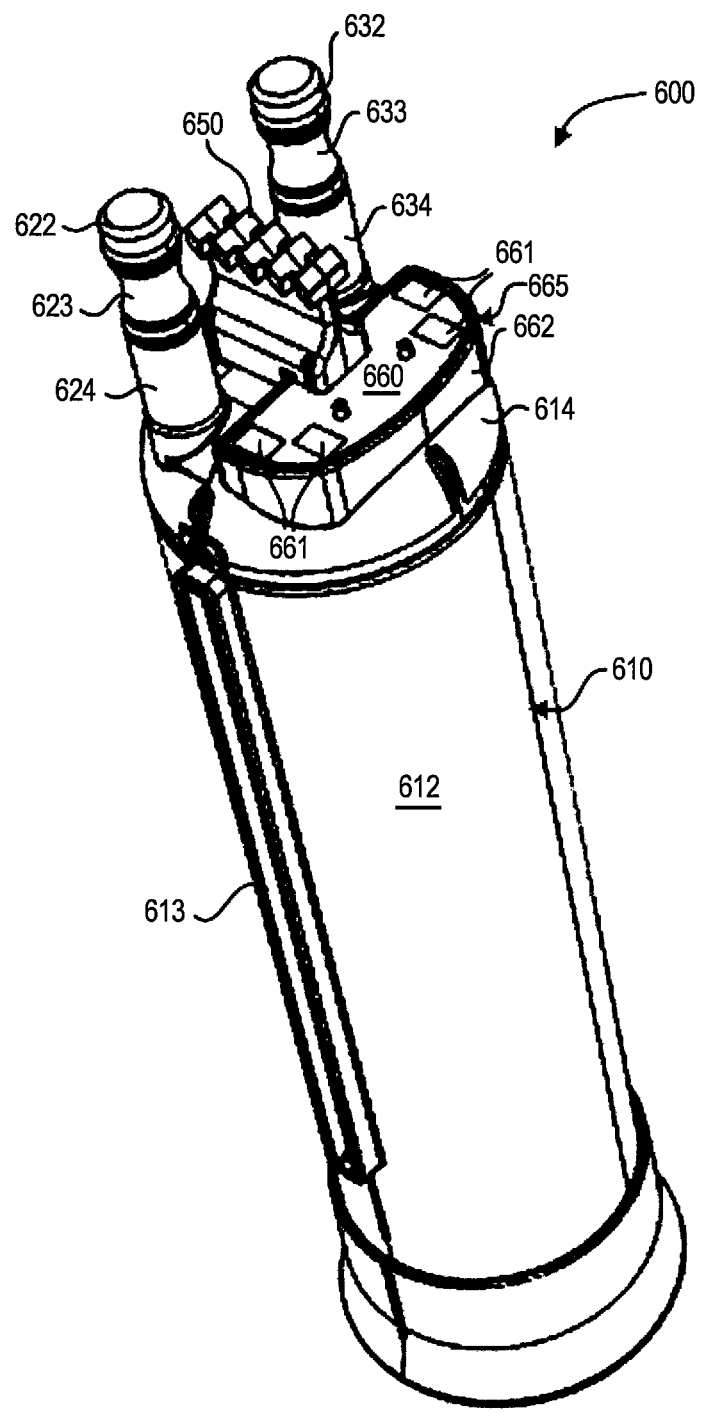
FIG. 12B is a front top perspective view of the filter assembly of FIG. 12A.
Figure 12C:
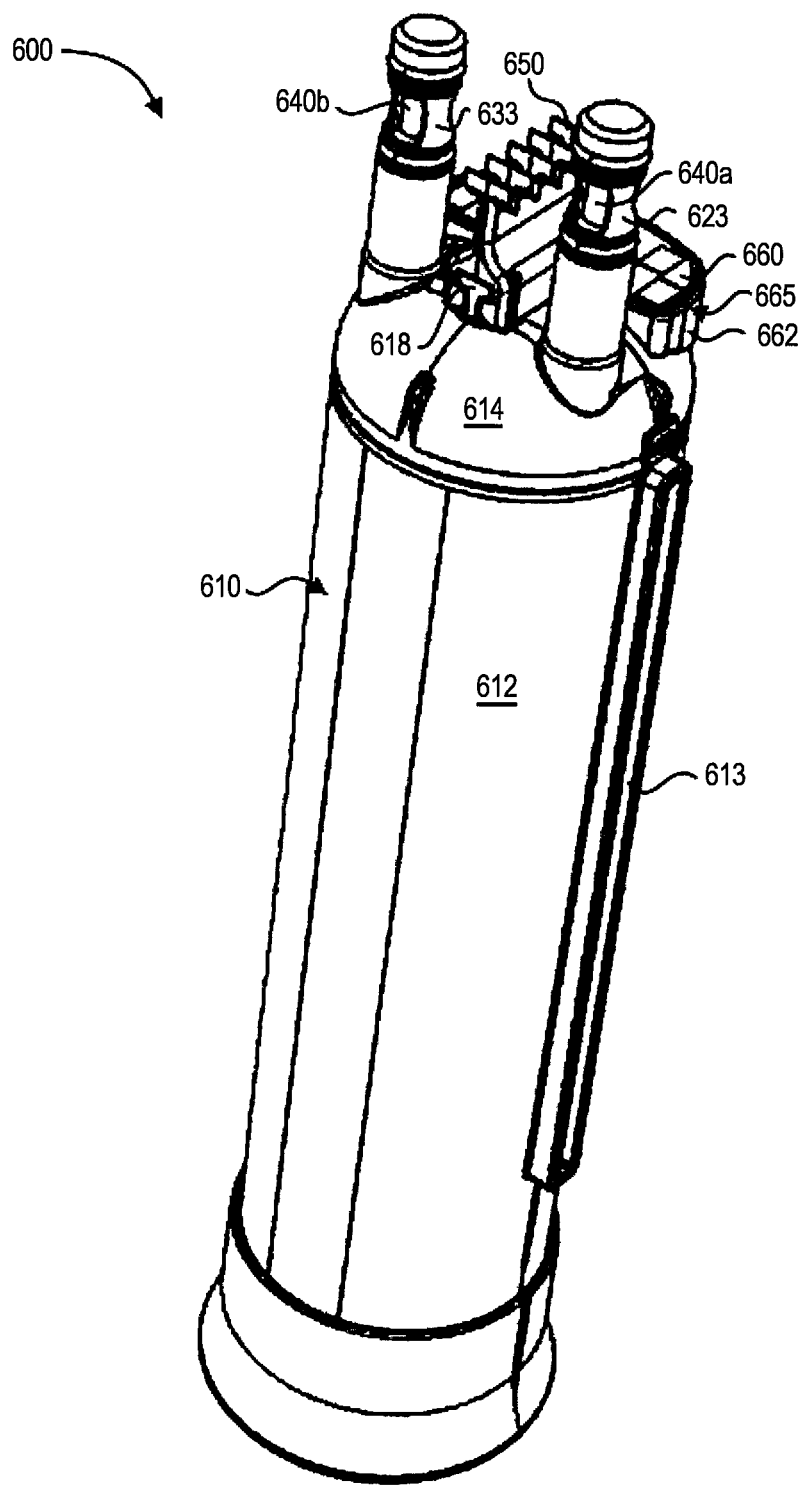
FIG. 12C is a rear top perspective view of the filter assembly of FIG. 12A.
Figure 12D:
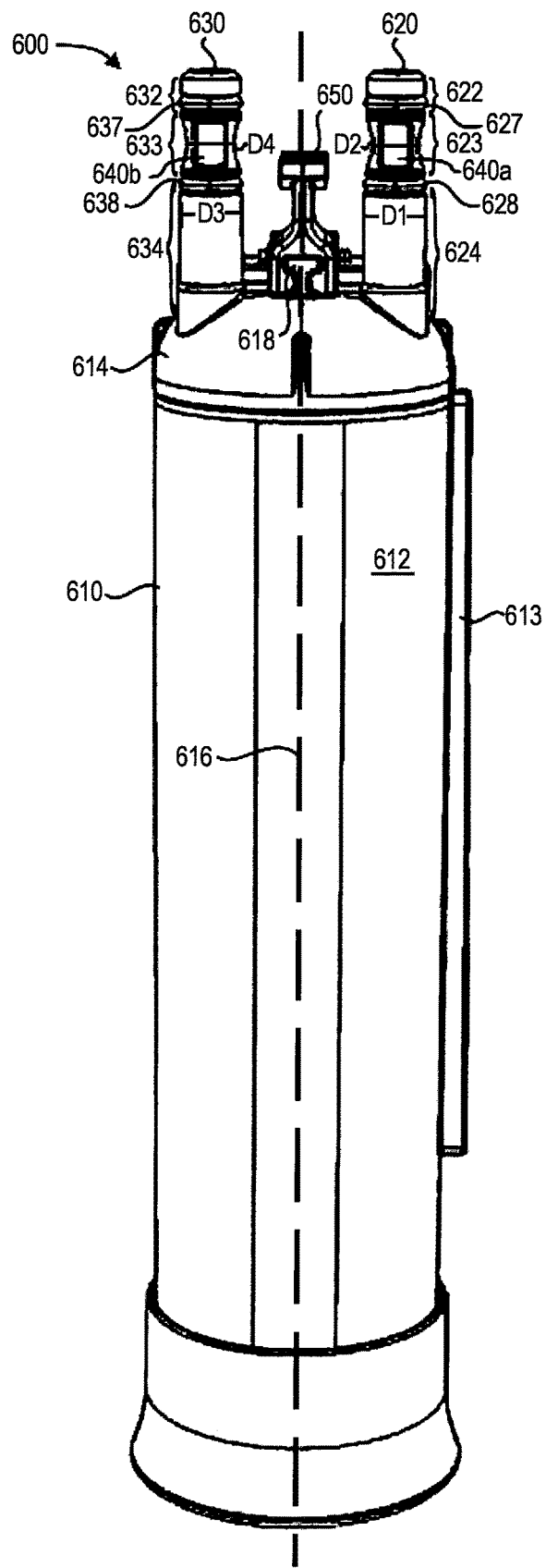
FIG. 12D is a rear elevational view of the filter assembly of FIG. 12A.
Figure 12E:
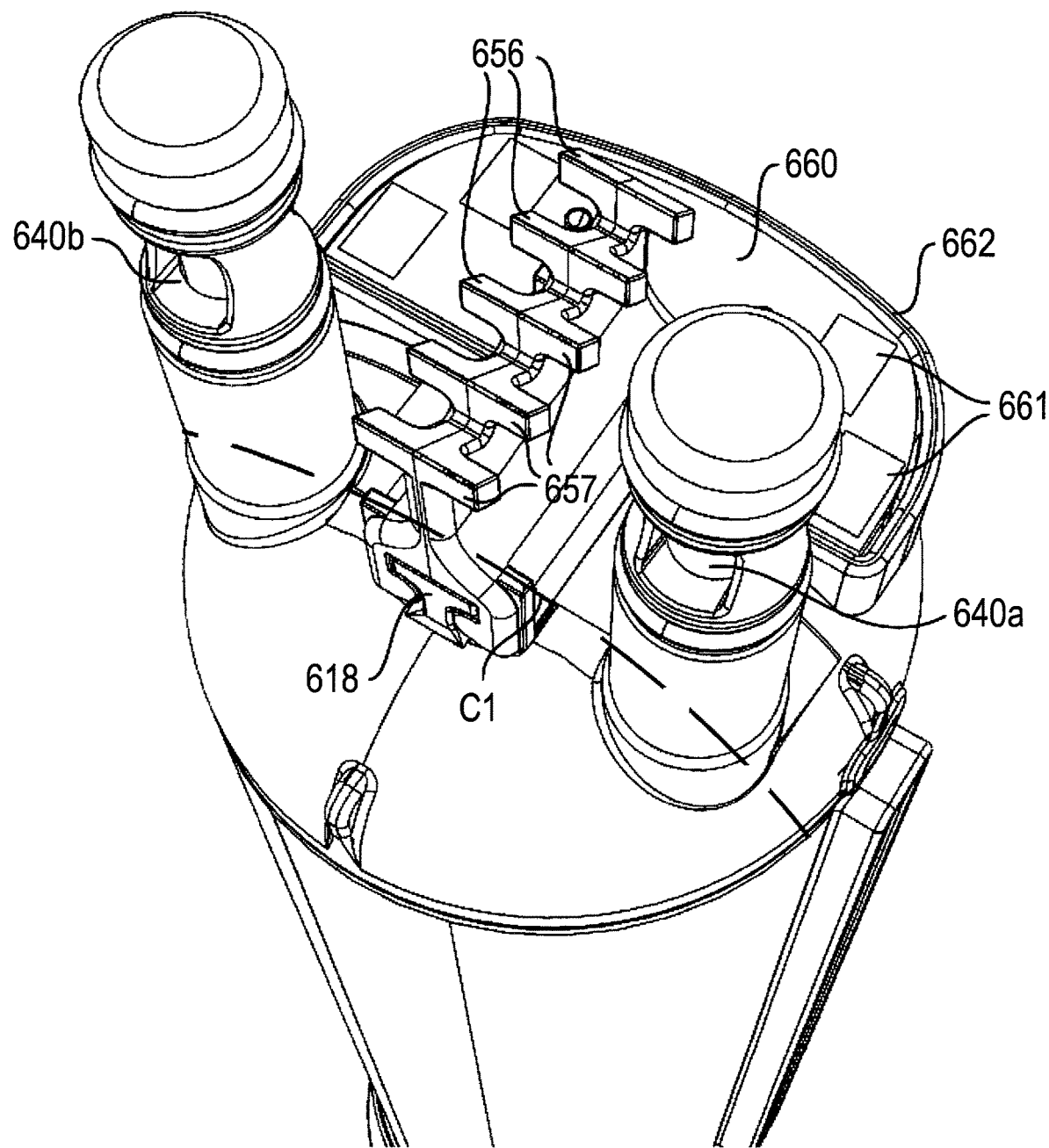
FIG. 12E is a partial, expanded rear top perspective view of the filter assembly of FIG. 12A.

Ingress port and egress port 620, 630 extend from, and are substantially perpendicular to, a non-diameter chord line C1 of the housing top portion 614, as shown in FIG. 12E. Moving the ingress and egress ports off a corresponding parallel diameter of the housing top portion is helpful to allow for sufficient space on the housing top portion 614 for placement of the PC board housing 662 and PC board 660. Dimensionally, the distance between chord line C1 and a parallel diameter of housing top portion 614 may be between 0.1-0.5 inches, and optionally 0.3 inches. The ingress and egress ports are off-diagonal center in order to accommodate the remaining particular features of the housing assembly 600. Ingress port 620 and egress port 630 are spaced apart from each other on chord line C1 by approximately 0.65-0.85 inches, and optionally 0.74 inches. The filter key 650 is centered on, and perpendicularly intersects with, chord line C1.

A "diameter" as used herein, may refer to a straight line passing through corresponding sides of the component/portion/segment, such as that of the port (ingress port 620 and/or egress port 630). Typically, the diameter is a straight line passing through opposite sides of the component/portion/segment, such as that of the port (ingress port 620 and/or egress port 630), e.g., in a plane perpendicular to the central axis of the water filter cartridge. Here, the length of the diameter is the perpendicular distance between the opposite sides of the component/portion/segment, e.g., in a plane perpendicular to the central axis. In some instances, the diameter line passes through a center, a centroid, a focus, a center of curvature, a circumcenter, and/or another center of a circular or non-circular cross-section of the component/portion/segment, such as that of the port (ingress port 620 and/or egress port 630) along the plane perpendicular to the central axis. In some instances, e.g., where the portion/segment of the port (ingress port 620 and/or egress port 630) comprises a circular or oval cross section, the diameter line may pass through a center and/or a focus of the cross section.

The filter key 650 structured for mating attachment to a filter base or manifold is located on or connected to the housing 610, and extends upwards in a direction parallel to the axial center 616 of the housing top portion 614. Filter key 650 comprises a base 651 having a front lateral side 652a, and a rear or back lateral side 652b, with a groove 654 running therethrough for receiving protrusion 618 on housing top port 614, and lengthwise or longitudinal sides 653 running substantially parallel to protrusion 618, as shown across FIGS. 13A-13C. Filter key 650 is secured to the housing top portion 614 via the connection between groove 654 and protrusion 618.

Base 651 extends upward along the housing top portion axial center 616, having the exposed front face and back face 652a, 652b, respectively, and two exposed longitudinal side faces 653a,b. A cross-section of the base 651 in a plane parallel to the front and back lateral faces 652*a,b* depicts longitudinal sides 653*a,b* gradually tapering inward through the upward extension, and then projecting upwards parallel to the central axis to a top surface that supports a finger or a plurality of fingers 655 as discussed further below.

From the top of base 651 extends finger 655 (and in at least one other embodiment, a plurality of extending fingers), the finger 655 extending substantially parallel to the exposed front and back lateral faces or sides 652*a,b*, and substantially perpendicular to the housing top portion axial center line 616. Finger(s) 655 further includes on one side a contacting portion 656 forming substantially a first angle and exposed in a first direction with respect to the housing top portion, which presents a camming surface for slidably mating with a filter base drive key. In a second embodiment, an adjacent side 657 is introduced (as depicted in FIG. 13) forming a second angle and exposed in a second direction with respect to the housing top portion, such that the first angle and the second angle are not equal.

Once installed on the housing top portion, the filter key is spaced approximately 0.4-0.6 inches—and optionally 0.53 inches—from either port 620, 630, as measured on the chord line C1 from the closest outer surface point of either port on each side of the filter key. In this manner, the filter key is centered between the ports. The filter key extends frontwards (away from the exposed face of apertures 640*a,b*) beyond chord line C1, extending through the center of both ports, such that lengthwise the filter key is not centered about the chord line C1, and extends in one direction (conventionally only, defined as frontwards) further away from the ingress and egress ports than in the opposite direction.

Figure 13A:
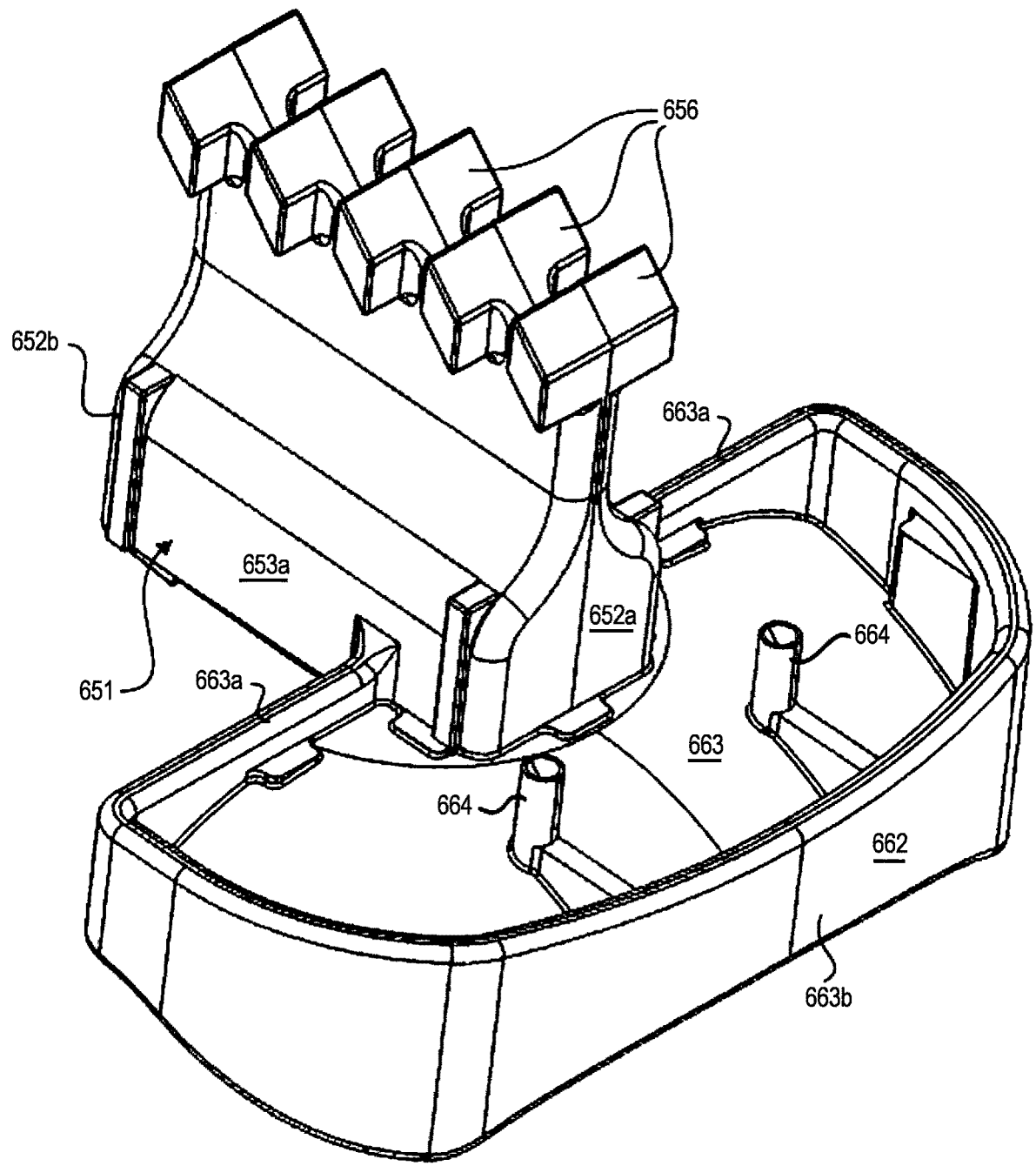
FIG. 13A is a front top perspective view of a filter key used with the filter assembly embodiment of FIG. 12A.
Figure 13B:
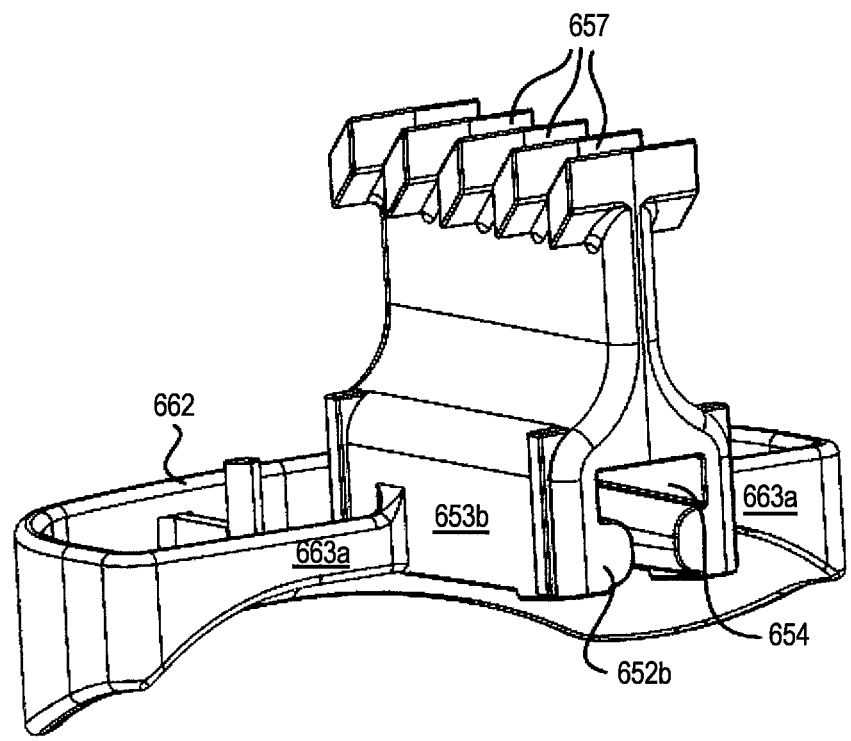
FIG. 13B is a rear perspective view of the filter key of FIG. 13A.
Figure 13C:
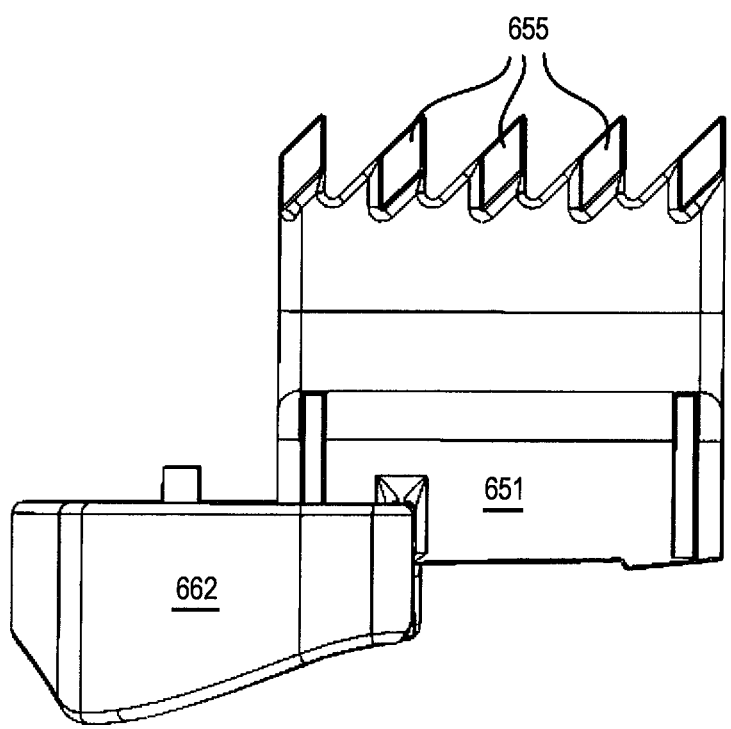
FIG. 13C is a side elevational view of the filter key of FIG. 13A.
Figure 14A:
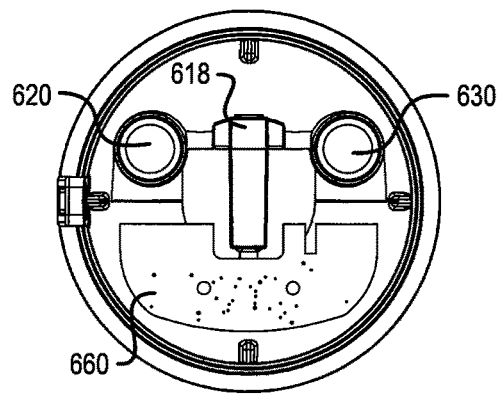
FIG. 14A is a top-down view of an embodiment of the filter assembly of FIG. 12A, with a printed circuit board directly affixed to the filter housing top portion without a PCB housing.
Figure 14B:
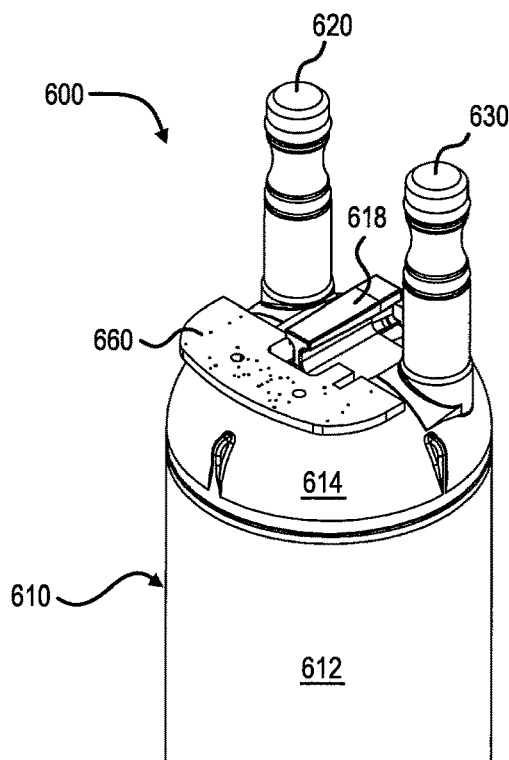
FIG. 14B is a partial perspective view of the filter assembly embodiment of FIG. 14A.
Figure 14C:
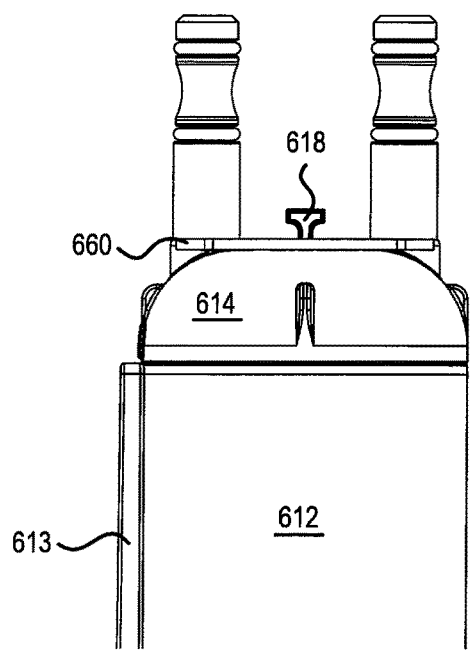
FIG. 14C is a partial front elevational view of the filter assembly of FIG. 14A.
Figure 14D:
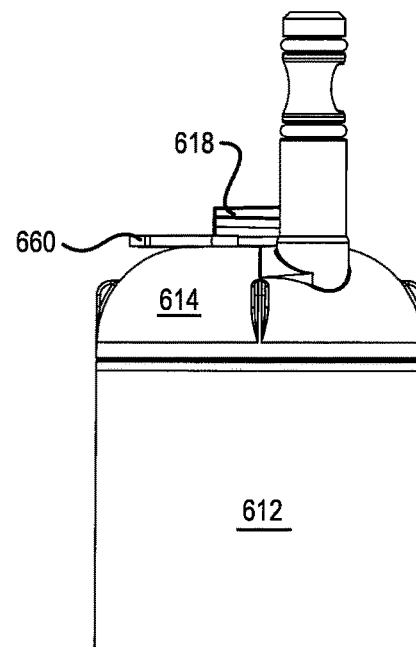
FIG. 14D is a partial side elevational view of the filter assembly of FIG. 14A.

A PCB housing or holder 662 having a recess 663 formed for receiving the printed circuit board 660 is extended frontwards from the filter key base. The PCB housing and recess being attachable to, or preferably integral with, filter key 650, as shown in FIGS. 13A-13C. The printed circuit board 660 may alternatively be connected directly to the filter housing 610, without the need for a PCB housing structure, as exemplified in FIGS. 14A-14D.

The filter key may extend partially within recess 663 as depicted in FIG. 13A. This filter key extended portion 650*a* may cause the attaching PC board to be shaped to accommodate the extended portion 650*a*, giving the PC board an elongated "horseshoe" shaped footprint around the extended portion. Recess 663 is substantially linear at one end 663*a* as shown in FIG. 13A, extending outwards from the filter key base exposed side faces 653*a,b*. The opposing side 663*b* of recess 663 may be curved as shown. The PCB housing 662 may have a length (from outside wall to outside wall) of approximately 1.47-1.67 inches (optionally 1.57 inches), and a lateral or shorter dimension of approximately 0.63-0.83 inches (optionally 0.73 inches). Recess 663 is depicted with a lengthwise dimension (from inside wall to inside wall) that may have a length at its substantially linear end 663*a* of approximately 1.37-1.57 inches (and optionally 1.47 inches), and with a lateral or shorter dimension having a length of approximately 0.52-0.72 inches (and optionally 0.62 inches), such that the recess resembles approximately a rectangular basin with curved corners on the end furthest from the filter key.

PCB housing 662 is connected to, or integral with, the longitudinal sides 653*a,b* of the filter key and extends on each side past—and centered about—the filter key exposed side faces 652*a,b* respectively. When installed, the PCB housing bottom surface preferably forms to the shape of the housing top portion 614. As the housing top portion 614 is depicted in one embodiment as being domed shaped, the PCB housing bottom surface is concave facing the housing top portion.

The PCB housing sidewalls extend upward from the PCB housing bottom surface such that the top edge of the PCB housing plateaus in a planar surface perpendicular to the housing axial center 616. The PCB housing is designed to receive a relatively straight, flat PC board. Alternatively, the PCB housing may be shaped in a non-plateauing manner to accommodate a printed circuit board that is not shaped as a flat board, and to allow for a proper electrical attachment of the filter housing 610 to a connector on the filter base.

PCB housing may be alternatively designed to extend past the rear lateral exposed back side of the filter key (not shown). In another alternative, PCB housing 662 may be presented as its own distinct piece separate from the filter key 650, to be separately connected to the housing assembly 600 (not shown). In still a further alternative, PCB housing 662 may be integral with the housing 610, either at the top portion 614 or elsewhere on the housing body 612 as manufacturing demands may require.

PCB housing 662 further includes exposed terminal posts 664 disposed therein for mechanically supporting the printed circuit board 660. Other extension features or ledges extending internally from the recess side walls 663*a, b* are used to support the PC Board about its periphery.

The PCB includes pads 661 for electrical connection to a connector located on the filter base. The pads 661 are optionally gold plated, and designed for swiping interaction with a corresponding connector terminal (not shown) during the insertion and removal of the filter assembly from its respective base. In an embodiment, the PC board includes four pads (two sets of two pad connectors) for electrical connection. The pads are exposed facing upwards on the PC board, and are preferably rectangular in footprint shape to accommodate tolerances in the filter base connector, especially during the pushing motion for insertion and extraction of the filter cartridge.

In operation, printed circuit board 660 assists a processor in utilizing crypto-authentication elements with protected hardware based key storage (up to 16 keys). Electronic components such as authentication chips, capacitors, resistors, diodes, LED's, and the like, are supported on the bottom side of the PCB, opposite the pads 661. The printed circuit board executes encryption capabilities using secure hash algorithms ("SHA") with 256 bit key lengths. The circuit board 660 is further capable of housing additional electronics for storing information pertaining to estimated water flow (through the filter housing assembly), and total filter usage time. This information is communicated via a main control board, the main control board being optionally installed on or within a refrigerator, and which further monitors the filter usage time and estimated water flow, among other variables.

It is envisioned that the preferred embodiment of the present invention would be disposed in a refrigerator (e.g. within the refrigerator cabinet). The output of the filter assembly may be selectively coupled to a water dispenser or an ice dispenser. The water source to the refrigerator would be in fluid communication with filter base 100, and prohibited from flowing when filter housing assembly 200 is removed from filter base 100. Shutoff plugs 14 in stanchions 1101*a,b* seal fluid flow until filter housing assembly 200 is inserted in filter base 100. Upon insertion, fluid would flow to the filter housing assembly and filter water would be returned from the filter housing assembly.

All parts of the filter housing assembly 200 and filter base 100 may be made using molded plastic parts according to processes known in the art. The filter media may be made from known filter materials such as carbon, activated carbons, malodorous carbon, porous ceramics and the like. The filter media, which may be employed in the filter housing of the instant invention, includes a wide variety of filter media capable of reducing one or more harmful contaminants from water entering the filter housing apparatus. Representative of the filter media employable in the filter housing include those found in U.S. Pat. Nos. 6,872,311, 6,835,311, 6,797,167, 6,630,016, 5,331,037, and 5,147,722. In addition, the filter composition disclosed in the following Published Applications may be employed as the filter media: US 2005/0051487 and US 2005/0011827.

The filter assembly is preferably mounted on a surface in proximity to a source of water. The mounting means are also preferably in close proximity to the use of the filtered water produced by the filter housing apparatus.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

The invention claimed is:

1. A filter cartridge assembly comprising:
    a housing having a substantially cylindrical body and a top portion for forming a fluid-tight seal with the body, the housing top portion having an axial center and further including:
    an ingress port and egress port extending from the housing top portion, each of said ingress port and egress port having a body with a top segment, a middle segment, and a bottom segment adjacent to the housing top portion and in fluid communication with said cylindrical body, the ingress port and egress port top segments having at least one seal at the junction with said middle segments, and the ingress port and egress port bottom segments having at least one seal at the junction with said middle segments, each of said seals having an outer surface first diameter, and the ingress port and egress port middle segments having an outer surface with a second diametric extension less than the ingress port and egress port respective seal first diameters, such that the ingress port middle segment and egress port middle segment are formed in an hourglass shape;
    a filter key located on or connected to the housing for mating attachment to a filter base, the filter key comprising an extended finger including on one side a contacting portion forming a first angle in a first direction with respect to the housing top portion and an adjacent side forming a second angle in the first direction with respect to the housing top portion, such that the first angle and the second angle are not equal;
    an electronic circuit component housing disposed adjacent to the filter key and having a recess for receiving an electronic circuit component therein, and for further connecting said electronic circuit component to the housing top portion, said electronic circuit component housing located on or connected to the filter cartridge assembly housing, said electronic circuit component housing at least partially surrounding the filter key and said filter key extending partially into the electronic circuit component housing recess; and
    a cavity on the ingress port middle segment for the passage of fluid, and a cavity on the egress port middle segment for the passage of fluid, the ingress port cavity and egress port cavity exposed in a direction facing away from the electronic circuit component housing.

2. The filter cartridge assembly of claim 1 wherein the ingress port and egress port extend from a non-diameter chord line of the housing top portion.

3. The filter cartridge assembly of claim 1 further including an electronic circuit component disposed within the electronic circuit component housing, wherein the electronic circuit component is a printed circuit board.

4. The filter cartridge assembly of claim 3 further including at least one terminal post disposed within said electronic circuit component housing recess for mechanically connecting said printed circuit board to said filter cartridge assembly housing.

5. A refrigerator comprising:
    a manifold configured to receive a filter cartridge assembly; and
    a filter cartridge assembly comprising:
    a housing having a substantially cylindrical body and a top portion for forming a fluid tight seal with the body, the housing top portion having an axial center and further including:
    an ingress port and an egress port extending from the housing top portion, each of said ingress port and egress port having a body with a top segment, a middle segment, and a bottom segment adjacent to the housing top portion and in fluid communication with said cylindrical body, the ingress port and egress port top segments having at least one seal at the junction with said middle segments, and the ingress port and egress port bottom segments having at least one seal at the junction with said middle segments, each of said seals having an outer surface first diameter, and the ingress port and egress port middle segments having an outer surface with a second diametric extension less than the ingress port and egress port respective seal first diameters, such that the ingress port middle segment and egress port middle segment are formed in an hourglass shape;
    a filter key located on or connected to the housing for mating attachment to a filter base, the filter key comprising an extended finger including on one side a contacting portion forming a first angle in a first direction with respect to the housing top portion and an adjacent side forming a second angle in the first direction with respect to the housing top portion, such that the first angle and the second angle are not equal;
    an electronic circuit component housing disposed adjacent to the filter key and having a recess for receiving an electronic circuit component therein, and for further connecting said electronic circuit component to the housing top portion, said electronic circuit component housing located on or connected to the filter cartridge assembly housing, said electronic circuit component housing as least partially surrounding the filter key and said filter key extending partially into the electronic circuit component housing recess; and
    a cavity on the ingress port middle segment for the passage of fluid, and a cavity on the egress port middle segment for the passage of fluid, the ingress port cavity and egress port cavity exposed in a direction facing away from the electronic circuit component housing.

6. The filter cartridge assembly of claim 1 wherein the ingress port cavity and the egress port cavity are both exposed in a direction opposite the filter key extended finger contacting portion.

7. The filter cartridge assembly of claim 1 wherein the ingress port top segment and bottom segment and egress port top segment and bottom segment are substantially cylindrical.

8. The filter cartridge assembly of claim 1 wherein the electronic circuit component housing is formed in a substantially horseshoe shape.

9. The filter cartridge assembly of claim 1 wherein the electronic circuit component housing is connected to or integral with said filter key.

10. The filter cartridge assembly of claim 9 wherein the electronic circuit component housing extends past and is centered about exposed side faces of said filter key.

11. The filter cartridge assembly of claim 1 wherein the electronic circuit component housing is connected to or integral with longitudinal sides of a base portion of said filter key.

12. The filter cartridge assembly of claim 1 wherein the electronic circuit component housing has sidewalls that extend upward from a bottom surface thereof, said sidewalls extending parallel to the filter cartridge assembly housing top portion axial center.

13. The filter cartridge assembly of claim 1 wherein the electronic circuit component housing has a bottom surface shaped to form to the filter cartridge assembly housing top portion.

14. The filter cartridge assembly of claim 13 wherein the electronic circuit component housing bottom surface is concave.

* * * * *

UNITED STATES PATENT AND TRADEMARK OFFICE
CERTIFICATE OF CORRECTION

PATENT NO. : 11,958,003 B2
APPLICATION NO. : 17/867141
DATED : April 16, 2024
INVENTOR(S) : Robert Astle et al.

It is certified that error appears in the above-identified patent and that said Letters Patent is hereby corrected as shown below:

In the Claims

Column 24, Line 23, in Claim 4, remove "a" and insert --said--

Signed and Sealed this
Thirtieth Day of July, 2024

Katherine Kelly Vidal
*Director of the United States Patent and Trademark Office*